United States Patent
Claessens et al.

(10) Patent No.: US 10,804,702 B2
(45) Date of Patent: Oct. 13, 2020

(54) SELF-ORGANIZING DEMAND-RESPONSE SYSTEM

(71) Applicant: REstore NV, Berchem, Antwerp (BE)

(72) Inventors: Bert Claessens, Kermt (BE); Jonas Engels, Antwerp (BE); Stef Peeters, Ukkel (BE); Jan-Willem Rombouts, Borgerhout (BE)

(73) Assignee: Centrica Business Solutions Belgium, Antwerp (BE)

( * ) Notice: Subject to any disclaimer, the term of this patent is extended or adjusted under 35 U.S.C. 154(b) by 90 days.

(21) Appl. No.: 16/157,431

(22) Filed: Oct. 11, 2018

(65) Prior Publication Data

US 2020/0119557 A1    Apr. 16, 2020

(51) Int. Cl.
*G06Q 50/06* (2012.01)
*H02J 3/28* (2006.01)
*H02J 3/00* (2006.01)

(52) U.S. Cl.
CPC ............... *H02J 3/28* (2013.01); *G06Q 50/06* (2013.01); *H02J 3/0073* (2020.01); *H02J 2203/20* (2020.01)

(58) Field of Classification Search
CPC ..................................................... G06Q 50/06
USPC ......................................................... 700/291
See application file for complete search history.

(56) References Cited

U.S. PATENT DOCUMENTS

| 8,097,967 | B2 * | 1/2012 | Hamilton | H02J 3/32 290/1 A |
| 8,417,391 | B1 * | 4/2013 | Rombouts | G06Q 40/04 700/291 |
| 9,450,408 | B2 * | 9/2016 | Lu | H02J 3/14 |
| 2011/0231320 | A1 | 9/2011 | Irving | |

(Continued)

FOREIGN PATENT DOCUMENTS

WO    WO2017/114810    7/2017

OTHER PUBLICATIONS

International Search Report and the Written Opinion, dated Dec. 5, 2019.

(Continued)

*Primary Examiner* — Suresh Suryawanshi
(74) *Attorney, Agent, or Firm* — Beyer Law Group LLP

(57) ABSTRACT

Energy loads, sources or batteries exchange mathematical models with each other to form clusters of devices that together provide a service (self-reliance, frequency control, etc.) to a grid operator. Models are exchanged before or after forming clusters; a particular model is used to control its own device and is also used by another load/source to influence its control policy. Heuristics and an optimization technique (using models) are used to form a cluster of devices. Exchanging models obviates the need for a central entity to directly control loads/sources, and the need to exchange real-time data between loads/sources, providing resilience against communication failure. A service manager (demand-response aggregator) sends a service or technical constraints to loads/sources to form clusters on their own.

(Continued)

Negotiation between manager and clusters occurs to form consensus on a response. Each device in a cluster is controlled by its own control policy which may depend upon the model of another device in the cluster. If communication is lost the clusters continue to implement the service.

45 Claims, 17 Drawing Sheets

(56) References Cited

U.S. PATENT DOCUMENTS

| | | | | |
|---|---|---|---|---|
| 2012/0065793 | A1* | 3/2012 | Kaji | H02J 3/14 700/291 |
| 2013/0342359 | A1* | 12/2013 | Miyaji | G08C 17/02 340/870.03 |
| 2014/0115336 | A1* | 4/2014 | Hwang | G06Q 30/02 713/170 |
| 2014/0285010 | A1* | 9/2014 | Cameron | H02J 1/14 307/18 |
| 2015/0280436 | A1 | 10/2015 | Weckx et al. | |
| 2016/0084892 | A1* | 3/2016 | Nielsen | G01R 21/00 702/61 |
| 2017/0220281 | A1* | 8/2017 | Gupta | G06F 3/0604 |
| 2018/0088545 | A1* | 3/2018 | Fuchs | G05B 15/02 |
| 2018/0130130 | A1 | 5/2018 | Dechu et al. | |
| 2019/0267808 | A1* | 8/2019 | Weindl | G05B 19/042 |

OTHER PUBLICATIONS

Mylrea Michael Et Al. Blockchain for Smart Grid Resilence, pp. 18-23, Sep. 18, 2017.

* cited by examiner

Demand-Response System

Device Agents Example

Distributed Architecture

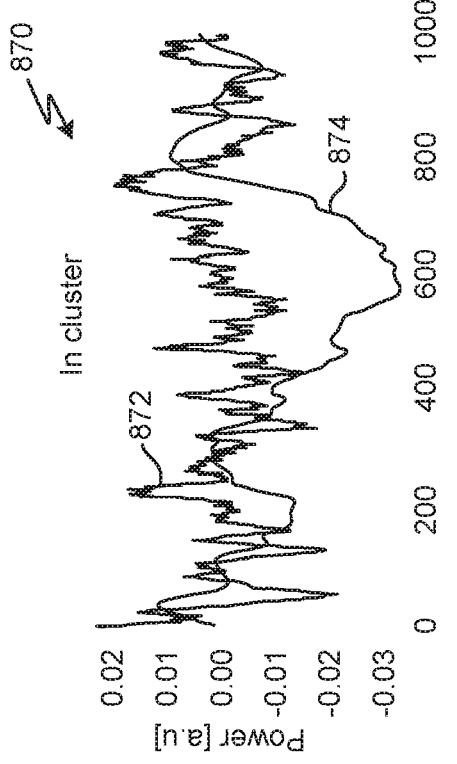
FIG. 16A
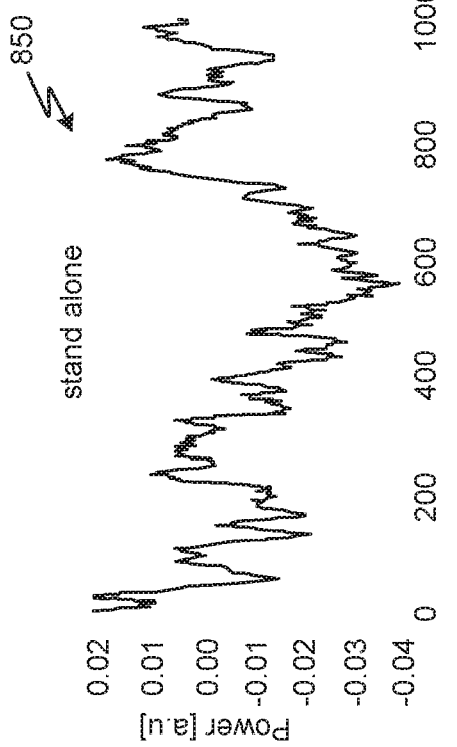
FIG. 16B
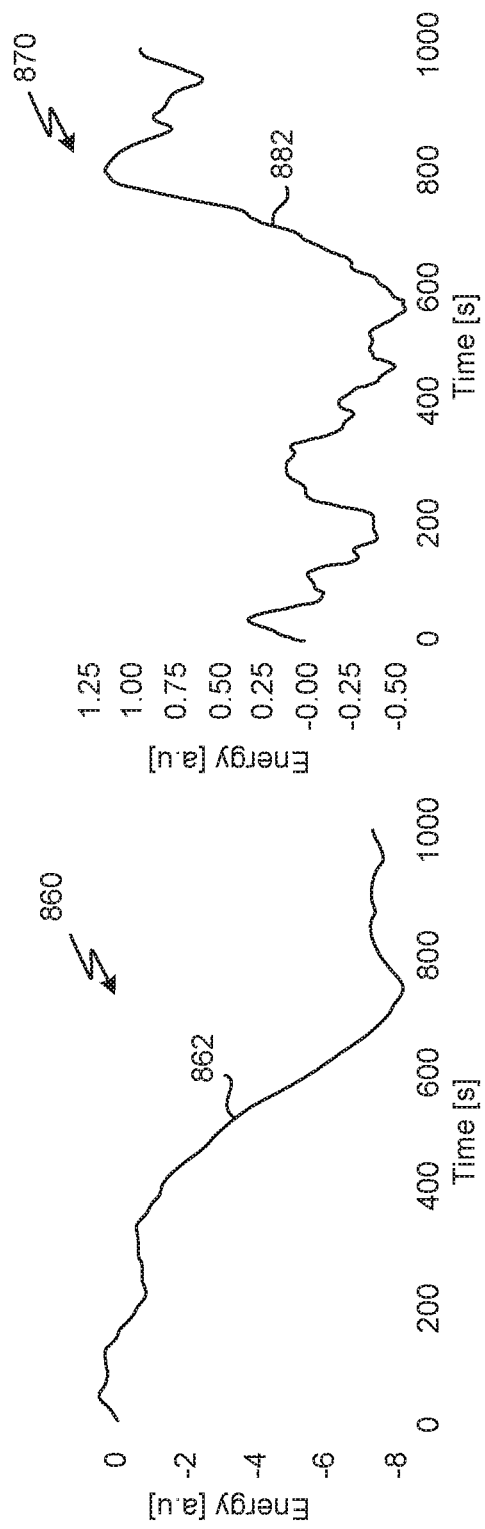
FIG. 16C
FIG. 16D

SELF-ORGANIZING DEMAND-RESPONSE SYSTEM

FIELD OF THE INVENTION

The present invention relates generally to demand response energy services. More specifically, the present invention relates to providing these services without or with minimal central control

BACKGROUND OF THE INVENTION

Energy management is pursued at many levels today for different types of energy. In the electricity market there is local energy management at industrial sites or residences, and distribution grid and transmission grid energy management. But, grid operators find it increasingly challenging to manage aspects of their respective energy grids such as balancing electricity supply with demand and responding to frequency shifts with respect to the electrical grid, among others, especially with increased energy usage and greater reliance upon wind and solar resources.

Demand Response (DR) includes a number of strategies for addressing issues with an electrical grid, and includes specific ancillary DR services such as frequency control (i.e., frequency following), signal tracking, market arbitrage, balancing services and self-reliance. Energy customers or aggregators of these customers may provide any of these services to a grid operator, energy market player or balancing responsible party (in the case of balancing services) in return for compensation or other value, although, such a service provider must meet strict performance goals.

For example, some services provide frequency control by using a central entity to perform a centralized optimization, and then sending commands or control policies directly to each individual load in order to control that load in response to frequency changes in the grid. But, should communication be lost between the central entity and the loads, it can be difficult to provide the frequency control needed by (or under contract with) the grid operator. The grid frequency may fluctuate and the ancillary service provider has not complied with its obligations. Further, this technique may not scale well unless over-simplistic approximations and heuristics are made.

Another approach is to send a random frequency set point to each load in a group above (or below) which the load needs to switch on (or off). Although simple, it does not allow for any constraint exchange mechanisms. One other approach is direct load control from a centralized point from which commands are sent to each load. This approach has poor scalability and is not fast enough for the most extreme demand response services.

Therefore, it is desirable for an improved demand response system not only to provide a more decentralized approach that does not rely upon a central entity, but also to provide a variety of demand response services.

SUMMARY OF THE INVENTION

To achieve the foregoing, and in accordance with the purpose of the present invention, a demand response system is disclosed that allows energy loads and sources to directly exchange their models and follow a control policy that depends upon the model of another.

Embodiments of the invention physically control a possibly heterogeneous cluster of energy loads and sources without reliance upon a central entity in order to provide different demand-response services. The loads, sources or batteries directly exchange mathematical models with each other in order to calculate their own dynamic response. In other words, a particular model is used both for controlling its corresponding load or source as well as for communicating information to another load or source. Exchanging models between loads and sources obviates the necessity for a central entity to directly control the loads and sources, and the need for exchanging real-time data between loads and sources, thus providing resilience against communication failure or information loss. Models are also used for calculating the effective transfer of constraints based upon which loads or sources can be remunerated (e.g., the number of cycles in the case of batteries).

Clusters of loads and generators (energy sources) are formed through peer-to-peer interactions and based upon the particular demand-response service to be provided. Loads, sources or energy storage devices (e.g., batteries) exchange models with one another, and, after executing a model to determine what a potential partner can provide with respect to the particular demand response service, the receiving load, source or battery decides whether or not to form a cluster with the potential partner. Clusters may also be formed based upon historical data that is learned over the course of time with other loads and sources. An energy load in a cluster may then depend upon the model of a partner load or source in a cluster in order to calculate its own control policy.

The invention provides a self-organizing demand-response framework that can be used in different modes for different demand-response services including: frequency control (e.g., FCR/FFR or FRR), tracking applications such as signal tracking (such as frequency or a power set point from a Transmission System Operator (TSO) or customer aggregator), self-reliance (a "no-wire alternative"), voltage control, balancing services and energy arbitrage. A service manager, such as a demand response aggregator, sends a particular business context (i.e., which service to implement) and technical constraints to all loads/sources so that these loads/sources may form clusters on their own in order to best implement the selected service. Even if communication is lost with the service manager, each cluster will continue to implement the selected service.

In addition to modes that provide demand-response services, the invention may also be used in a mode that addresses technical constraints of loads and sources. I.e., loads and sources may create clusters based upon a technical context that alleviates a technical constraint or constraints. For example, consider a street with batteries in residences, a set of PV panels and a grid connection constraint at street level. The assets work together to form a cluster and perform, e.g., self reliance, whilst respecting the grid constraint at street level. Other technical constraints include typical grid/network constraints such as maximum transformer temperature, maximum current, minimum and/or maximum voltages, maximum local ramp rate, the maximum power or current that is allowed to run through a cable that supplies a cluster of devices, and the maximum and/or minimum voltage that is allowed in a grid (for example, a local source of renewable energy can result in an increased voltage, to prevent this voltage from reaching a critical constraint, a cluster is formed with a neighboring battery that can start charging). Further examples of technical constraints of devices are found in step 402.

The invention is generic and scalable, and can be used for demand response of large heterogeneous clusters of loads and sources, where each load or source on its own is constrained in terms of its participation in the demand-response service in scope. Using the concept of clusters naturally extends to a distributed way of optimizing an overarching objective that couples many clusters together. The invention may also be used for large-scale optimizations such as energy arbitrage.

The described methods and systems may also be deployed in the context of heating networks. As known, a heating network is a network that distributes thermal energy (via a heated liquid) rather than electricity. Practically speaking, a heating network is a network of tubes in the ground through which hot water (for example) flows; users can take energy from the network through a heat exchanger and producers can heat the water in the network. These are typically local networks, such as district heating networks.

In a first embodiment, a method controls an energy device in a pool of energy devices by applying a heuristic to identify another energy device to provide a service to a grid operator. An optimization is performed on a computer using power models of both devices in order to calculate a value of the devices working together to provide a service required by a grid operator. A cluster is formed of the devices and a control action from a device agent provides a power level to the energy device that partially depends upon the power model of the other energy device, thus providing a service to the grid operator. A system controls the energy device in the same manner.

In a second embodiment, a method controls an energy device in a pool of energy devices in a self-reliance mode by applying a heuristic to identify another energy device that provides energy complementary to the energy device. A cluster is formed of the devices in which a net energy to or from the cluster is minimized A computer of the energy device includes a power model of the energy device and receives a power model of the other energy device. A control action from a device agent provides a power level to the energy device that partially depends upon the power model of the other energy device, thus providing a cluster which can be self reliant. A system controls the energy device in the same manner.

In a third embodiment, a method provides a service to a grid operator. Clusters of energy devices are formed out of a pool, each cluster being formed by exchanging models between the energy devices of each cluster and optimizing each cluster using the models to provide the service. Each cluster bids, and a service manager compares a total of all bids to its own bid to provide the service. If the bids are deemed close to the service manager bid then each energy device of each cluster implements a control policy based upon the optimizing of each cluster, thus providing the service. A system provides a service in the same manner.

In a fourth embodiment, a method provides a service to a grid operator using a distributed architecture. Clusters of energy devices are formed out of a pool, each cluster being formed by exchanging models between the energy devices of each cluster and optimizing each cluster using the models to provide the service. A service manager process represents one of the clusters and executes on a computer local to the cluster. A peer-to-peer consensus-seeking technique iteratively request bids from each cluster using the service manager processes, and a service manager process compares a total of all bids to its own bid to provide the service. If the bids are deemed close to the service manager bid then each energy device of each cluster implements a control policy based upon the optimizing of each cluster, thus providing the service. A system provides a service in the same manner.

In a fifth embodiment, a method controls an energy device in a pool of energy devices by applying a heuristic to identify another energy device to satisfy a technical constraint. An optimization is performed on a computer using power models of both devices in order to calculate a value of the devices working together to satisfy the technical constraint. A cluster is formed of the devices and a control action from a device agent provides a power level to the energy device that partially depends upon the power model of the other energy device, thus satisfying the technical constraint. A system controls the energy device in the same manner.

BRIEF DESCRIPTION OF THE DRAWINGS

The invention, together with further advantages thereof, may best be understood by reference to the following description taken in conjunction with the accompanying drawings in which:

FIGS. 16A and 16B show the battery operating stand-alone.

FIGS. 16C and 16D show the battery operating in combination with a slow industrial device.

DETAILED DESCRIPTION OF THE INVENTION

Figure 1:
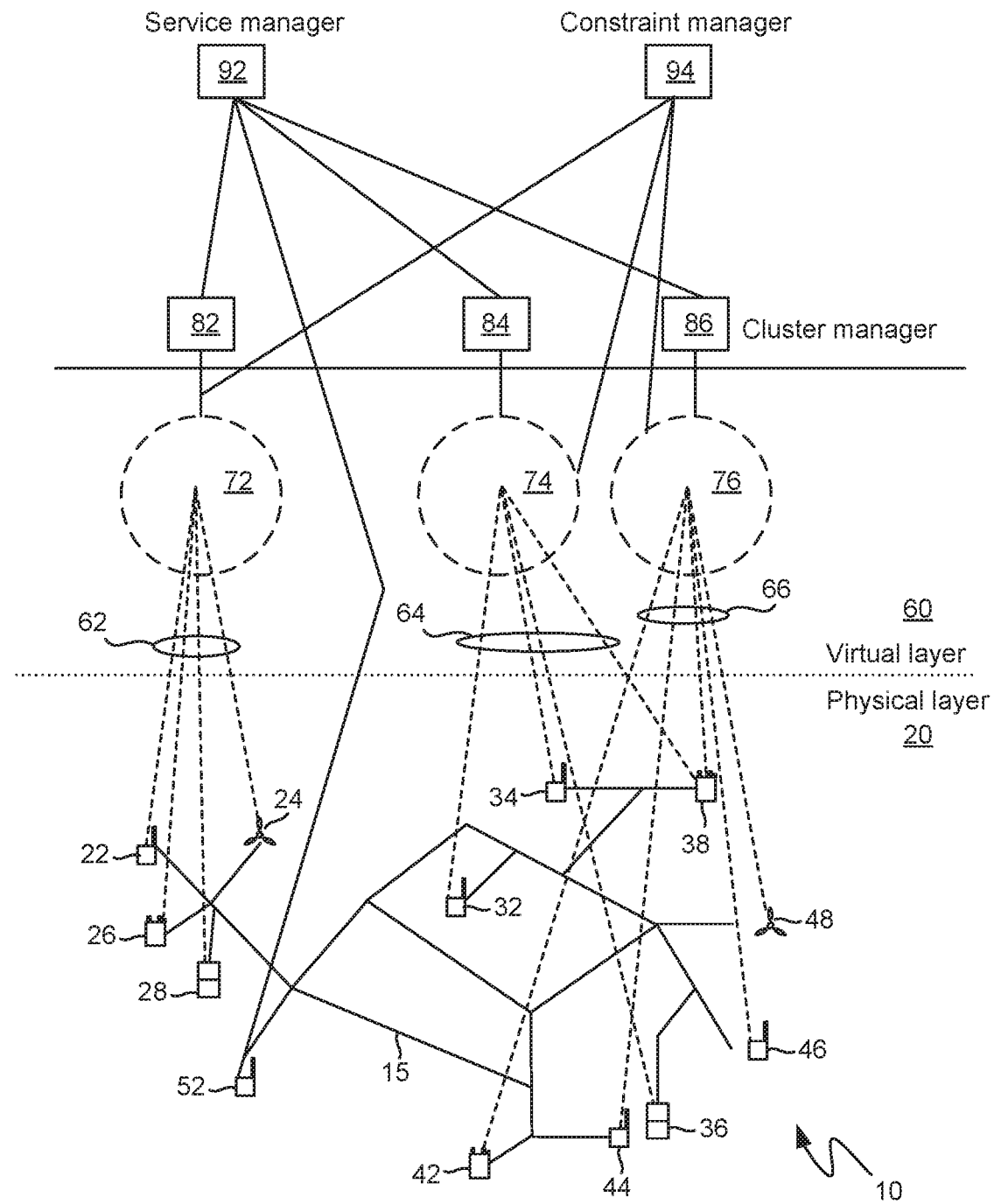
FIG. 1 is a block diagram of a demand response system that includes both a physical layer and a virtual layer.

The invention is applicable to a variety of demand-response services, a few examples of which are provided below.

In the context of self-reliance, assume that a natural disaster has disrupted central communication in a particular region, and has perhaps disrupted a variety of energy sources and loads. By default, each device is programmed to fall back to a self-reliance mode when central communication is lost. In this scenario, the devices will exchange mathematical models between themselves, and devices that produce energy will tend to combine and form a cluster with devices that consume energy, striving for a net energy consumption or production of zero within the cluster, or as close as possible.

In another self-reliance example, a residential community includes dwellings with photovoltaic (PV) systems and dwellings with electric vehicles or residential batteries, and all dwellings also have electricity-consuming appliances. The dwellings that have PV systems in combination with a battery can charge the battery when there is an excess of PV energy and can discharge the battery in the evening when demand exceeds production. Thus, after an exchange of models, a cluster of devices may be formed that includes the PV systems, battery and appliances of a particular dwelling. For those dwellings that have PV systems and no storage, however, it makes sense to form a cluster with a neighbor having storage (e.g., a battery or a hot water heater), but no PV systems. Mathematical models are exchanged in order to form such a cluster. As such, the energy generated by one dwelling is stored by its neighbor, thus mitigating grid losses, and in an extreme case even resulting in communities that are completely self-reliant.

In an example of frequency control, a fast energy device such as a battery (typically energy constrained) and a slow energy load such as an industrial oven (typically not energy constrained) are both used to respond to frequency deviations. Typically, such a slow industrial load cannot fully provide frequency control service compliant with the requirements set forth by the TSO or by regulations and it needs a partner, such as a battery, that can compensate for its low ramp rate. In exchange, the slow load compensates for the throughput (number of cycles) and limited energy content of the battery. These devices will exchange their mathematical models. The battery will then have the model of the slow device (indicating that the slow device can respond well to slow frequency signals), and the slow device will have the model of the battery (indicating that the battery can respond rapidly to fast frequency signals). Each device realizes that it would work well with the other in the context of frequency control, and a cluster of the two devices is formed. The battery knows how the slow device will respond to a frequency deviation because it has its model; the battery can then respond appropriately to frequency changes so the combination of the battery and the slow asset meet the frequency control requirements. No central entity is needed to tell both devices when or how to respond and the devices do not need to communicate with one another in real time regarding how each is responding because they each have the model of the other.

The invention also can be used with so-called no-wire alternatives/micro-grids. The simplest example is the example of a PV system, a load and battery that try to be as self-reliant as possible at street level. In case there is no energy flowing in and out of this cluster, this is considered a true micro-grid, no longer requiring a wire to deliver power to the cluster, hence a "no-wire alternative."

Demand Response System

FIG. 1 is a block diagram of a demand response system 10 that includes both a physical layer 20 and a virtual layer 60. As shown, physical layer 20 includes a pool of any number of energy assets that are physically connected to an electrical power grid 15, the power (consumption or production) of each which can be partially controlled via local computing hardware. This local hardware communicates with each energy asset (via cable or wireless) and sends physical commands by which the asset responds by changing its power consumption or power production. The local hardware includes a configurable control policy that determines the next control action and a time interval as a function of a business context, an external event (for example, in frequency control the policy can include a droop curve that determines the reaction of the asset to a local frequency change), the model of the asset, and perhaps the model of another asset.

As shown, energy assets include industrial loads 22, 32, 44, 46 and 52, batteries 26, 38 and 42, as well as hot water or other heaters 28 and 36. Not all assets need be capable of flexibly consuming power; assets also include local production such as wind energy 24, 48 and photovoltaic (PV) systems (not shown). A wide variety of energy loads, energy generators and batteries may be used in the present invention. Industrial loads include: cold stores, ovens and other thermal loads, pulp grinders, stone grinders, compressors, furnaces, industrial electrolysis machinery, HVAC equipment, paper processing equipment, material handling equipment, oil and gas pumping systems, electric vehicle charging networks, agriculture equipment, etc. Each load is typically an autonomous machine or set of machines in an industrial site and is often connected to and is part of an industrial process. Residential loads include: water heaters, batteries, heat pumps, electrical vehicles, lights, and other loads of a household. In general, an energy asset (or energy device) is any energy load, energy generator or energy storage device (e.g., a battery) that can change its energy consumption, production or storage upon command. By changing the production or consumption of an energy asset, the asset will have a positive impact on the power grid in terms of cost of operation, resilience and constraint management. The term "device" is used to refer to energy assets below for simplicity.

Virtual layer 60 is a set of processes executing upon computer systems. Virtual layer 60 allows assets with different physical constraints to form clusters; clusters 72-76 represent conceptually how various of the energy assets may be formed into clusters as will be described below. By way of example, cluster 72 represents energy assets 22-28. A particular energy asset, such as industrial load 52, need not necessarily be part of a cluster. A cluster may be defined based upon a business context or upon a technical constraint (e.g., an asset-level constraints or an external constraint such as a grid constraint). By way of example, two batteries may form a cluster in order to obtain more revenue than if they had operated standalone. Or, a battery and an industrial load at the same industrial site form a cluster in order to prevent the power at the site level from violating a technical constraint.

Also shown are any number of cluster managers 82-86, each representing a particular cluster. A cluster manager is a software agent executing upon any suitable computer that represents a cluster (two or more) of energy assets (e.g., cluster manager 86 represents assets 42, 44, 46 and 48). A cluster manager may execute upon any suitable local computing hardware associated with a particular energy asset, may execute upon any computer provided by a cloud service, upon service manager 92, or upon any other suitable computer. The cluster manager performs calculations for the cluster (runs models, performs optimizations) and negotiates with service manager 92 in order to provide a service to a grid operator or any other energy market players. A device agent (described below) may also perform these calculations.

A constraint manager 94 is also a software agent executing upon any suitable computer that represents a set of constraints; one example is a constraint manager that represents a grid operator having a power grid constraint. The constraint manager also participates in the negotiation in step 520; it can send its constraint (or constraints) to the same computer where the multipliers are updated in step 452. It can of course also be integrated into the service manager 92.

Service manager 92 is also a software agent executing upon any suitable computer that represents a central entity, such as a demand-response aggregator (e.g., REstore NV). The service manager is responsible for defining a current business context and sending that business context (along with a packet of information) to each energy asset or cluster. By way of example, for a pool of assets participating in a service such as frequency control, the service manager sends that business context in order that the assets in the pool shall determine if they should form clusters in order to provide the service.

Figure 11:
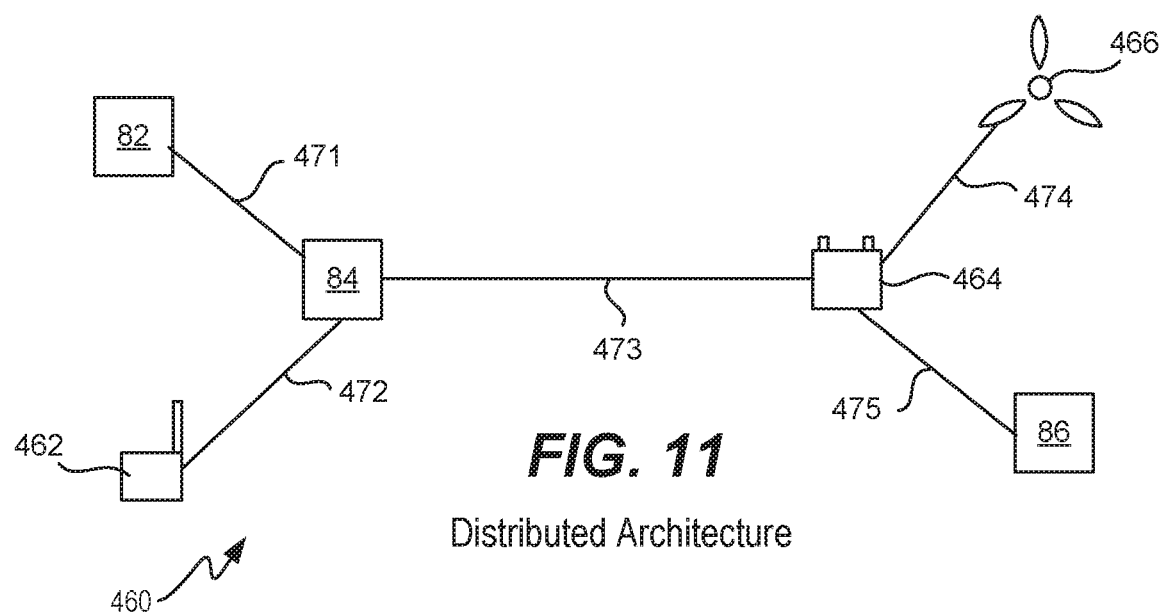
FIG. 11 is a diagram illustrating how any number of cluster managers or standalone devices coordinate with each other using a distributed architecture in order to build consensus in a particular business context without interacting with a central entity.

Communication with and between the energy assets may be performed by a central entity or by using peer-to-peer communication. As shown in FIG. 1, service manager 92 communicates directly with asset 52 and with cluster managers 82-86, which each in turn communicate with their respective energy assets via communication links 62-66. Any fully-connected graph structure may be used to implement communication via a central entity. In one alternative embodiment, the energy assets of a pool communicate in a peer-to-peer fashion and do not need any input or control from a central entity when forming clusters or controlling their power consumption or production. FIG. 11 (described in more detail below) shows one example of a peer-to-peer communication scheme in which the energy assets do not need input from a central entity. The advantages of peer-to-peer communication are its resilience in the face of communication loss and its ability to implement the business context of self-reliance (described below).

The communication means between the service manager, the clusters and devices may be any suitable means including narrow-band IoT, ADSL, 4G or Ethernet. The peer-to-peer communication may use similar means.

Device Agent on Local Computing Hardware

Figure 2:
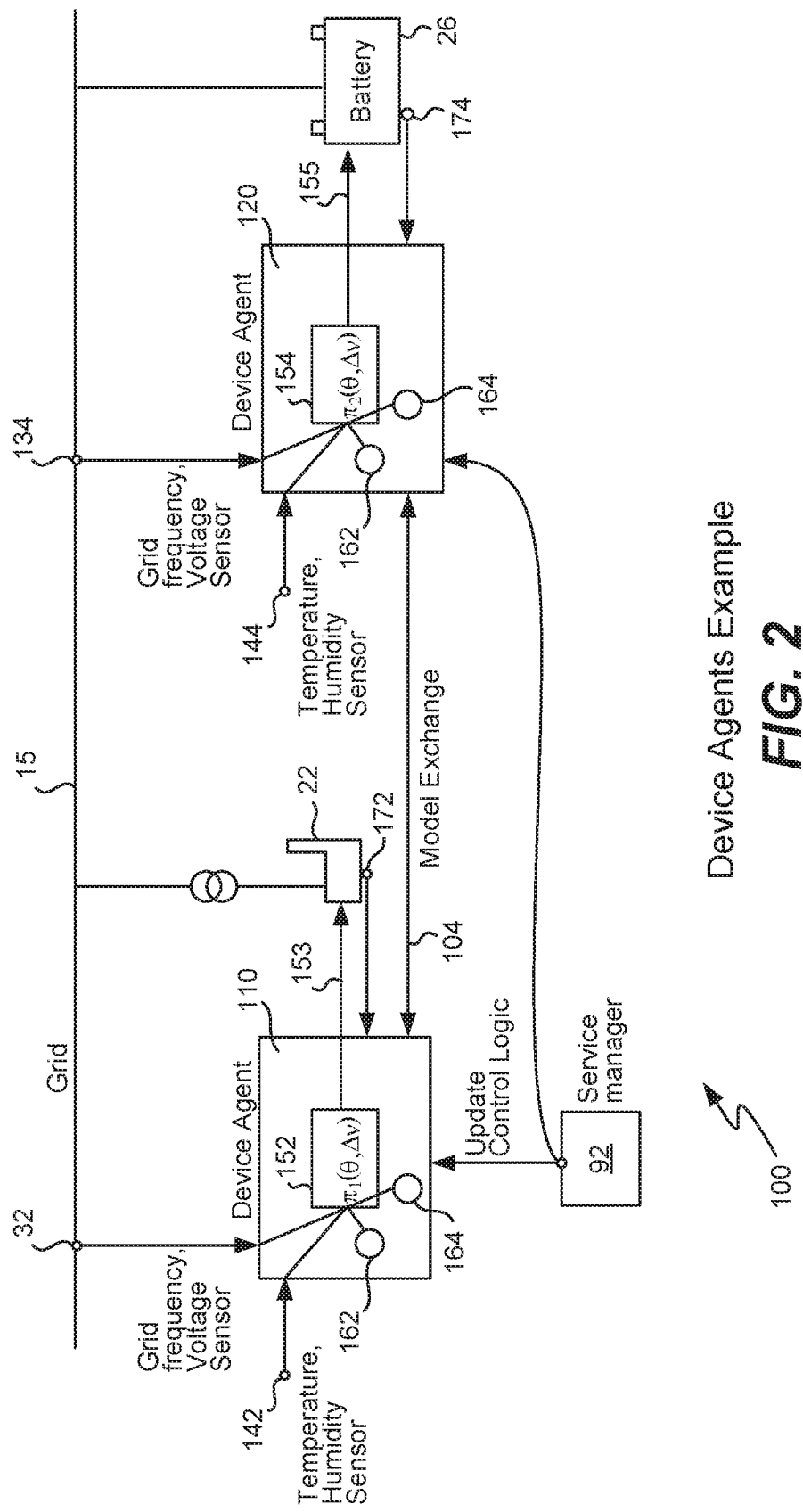
FIG. 2 illustrates an example of two device agents that control respectively two different devices, an industrial load and a battery which are both connected to an electrical grid.

FIG. 2 illustrates an example 100 of two device agents 110 and 120 that control respectively two different devices, an industrial load 22 and a battery 26 which are both connected to an electrical grid 15. Each energy load, source or battery of system 10 has an associated device agent which is software that executes on local computing hardware in close proximity to the device to be controlled. In one embodiment, a device agent and it sensors are considered "close" to its associated device when there is a delay of approximately 0.1 seconds or less between detecting an event at a sensor (e.g., frequency deviation) and delivering an appropriate control action from the device agent to the device. It is also possible for an agent to be considered "close" if the delay is greater than 1 second, as long as there is no third-party software or hardware in between the device agent and the device that jeopardizes the delivery of the messages.

Figure 18A:
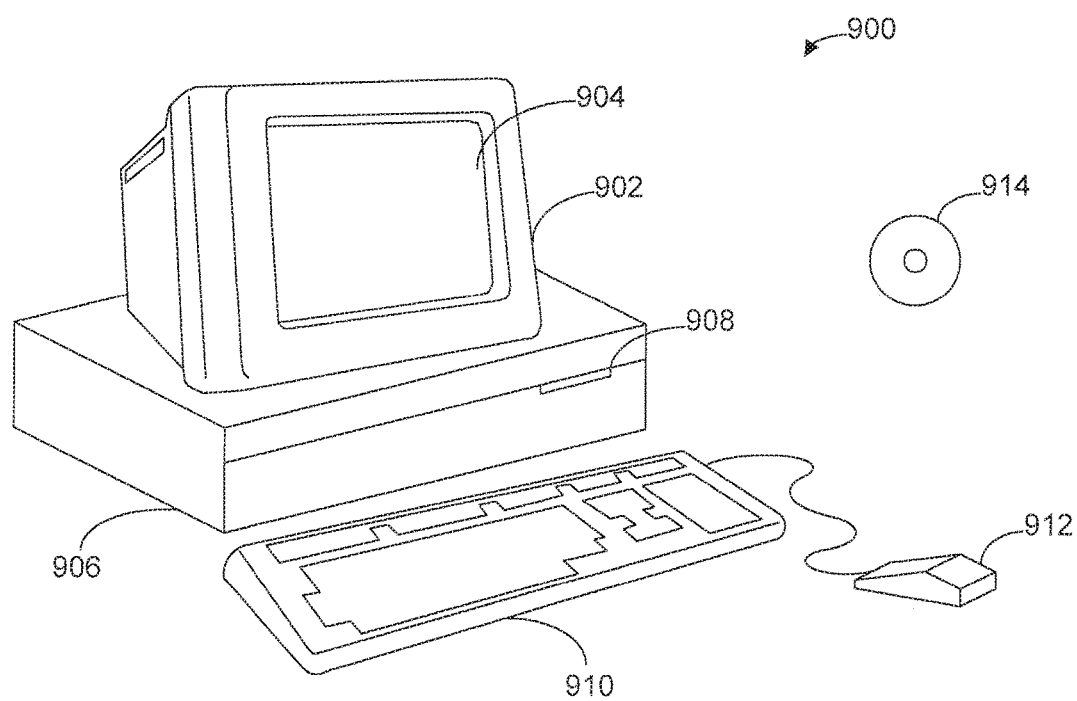
FIGS. 18A and 18B illustrate a computer system suitable for implementing embodiments of the present invention.
Figure 18B:
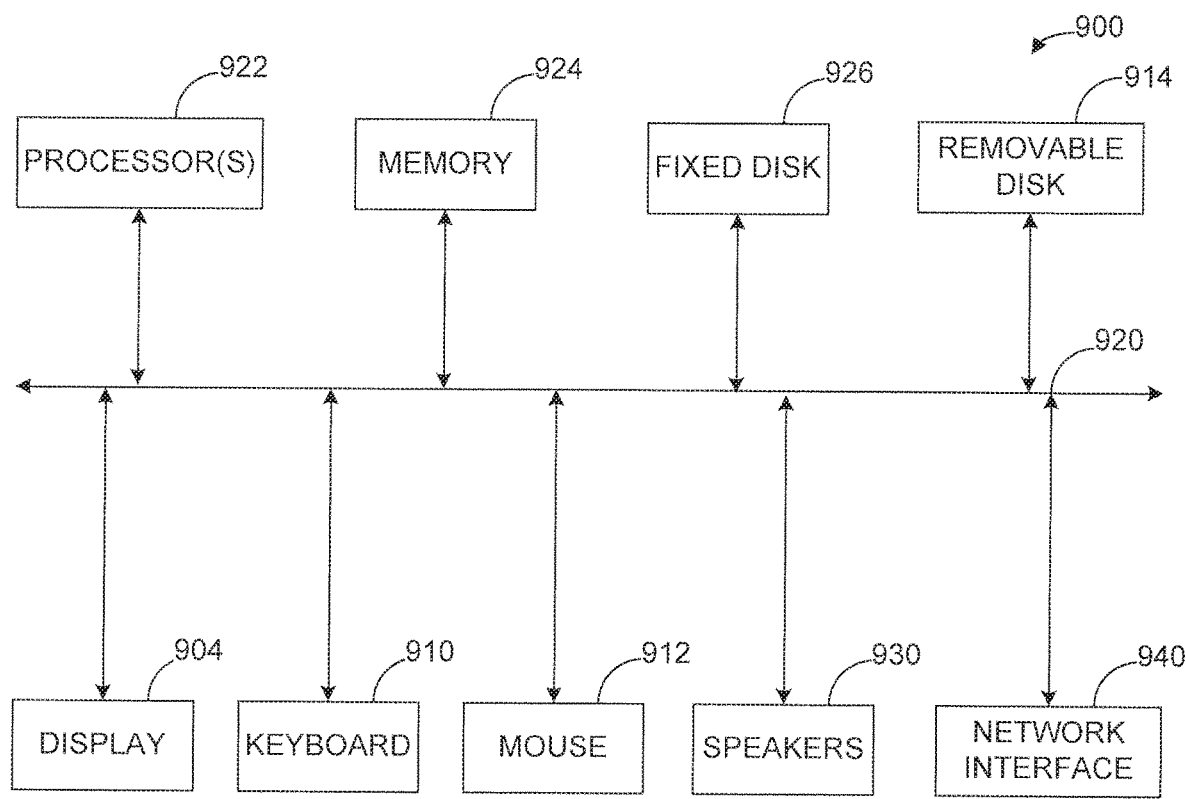

Each device agent is able to receive a business context from service manager 92, sense its environment via sensors, exchange information and models with peers, perform calculations, execute a control policy and generate a control action to send to its associated device. Models 162 and 164 of load 22 and battery 26 may be exchanged between device agents via a communication link 104. The device agent may execute upon a suitable computer as shown in FIGS. 18A and 18B, or upon specialized computing hardware such as a 1 GHz ARM cortex with 1 GB of RAM. In one very specific embodiment, local computing hardware is implemented using a "FlexTract" controller available from REstore N.V. of Antwerp, Belgium.

Any number of external grid sensors 132 and 134 connect to the electrical grid 15 and sense variables such as grid frequency, voltage or power quality, and send this information to the device agent on the local computing hardware. In addition, any number of external environmental sensors 142 and 144 sense variables such as temperature, humidity, solar radiance, occupation level (relevant when controlling a HVAC system connected to a building), etc., and also sends this information to the device agent. Preferably, sensors 132, 134 connect to the grid as close to load 22 or battery 26 as practicable, and sensors 142, 144 are also located as close to the load or battery as possible, in order to perform their measurements locally. Any number of sensors 172 sense the state of load 22 (such as the ramp rate, the amount of pulped paper in a container, etc.), and any number of sensors 174 sense the state of battery 26 (such as the battery energy and temperature). Not shown are sensors that sense information associated with an energy source, such as active and reactive power of a PV system or wind turbine.

Also executing on the local computing hardware is a software controller (not shown, described below) which executes under control of the device agent. In this example, devices 22, 26 have not yet formed a cluster but do exchange models with the goal of forming a cluster. The controller creates a software control policy (this can also be calculated elsewhere) 152 or 154 which then generates a control action 153, 155 for the corresponding device 22 or 26. As known, each control policy implements a function 7E, defined by $\theta$, a parameterization of the function. Typically, $\theta$ is a vector and may include the numbers of a neural network, the coefficients in a linear model, the parameters of a Proportional-Integral-Derivative (PID) controller, or simply the rules of a rule-based controller. In this example, each control policy currently depends upon an internal state "x" of the device and any external information "v" from the external sensors previously mentioned. As will be discussed in greater detail below in FIG. 8, once devices 22 and 26 exchange models and decide to form a cluster, control policy 152 may also be a function of not only the model 162 of load 22, but also the model 164 of battery 26.

In general, a controller executing upon the local computing hardware is a software module under control of the device agent that not only encompasses the input data (models, states, sensor data), but also creates the control policy and generates the control action to send to its corresponding device. Each local controller is able to switch its business context, sense its environment, allow for external configuration, receive external information and create a control policy for the device or devices it is connected to.

A controller may be implemented in a variety of manners. By way of example, a list of PID controllers may be used, each with a different parameterization; the parameter sets can be changed externally. A specific example of this is when in the self-reliance business context, a PID controller is used to charge a battery based upon an excess or deficit in energy. A rule-based controller such as a decision tree may also be used; changing its business context may change its set point, target point or the sensors it uses, resulting in control that uses a different data set. Another example is a model predictive control (MPC) controller where a model of the device is used together with an objective and constraints which can all be configured. MPC controllers can also take into account models of other devices in its decision-making (e.g., for fast-slow combinations). A controller may also be implemented as a droop curve where a predefined power is requested based upon an external event such as a frequency deviating from the nominal frequency. And, a controller may be a data-driven controller, which is based upon reinforcement learning where the reward and constraints can be configured. A controller typically controls one device, although it is possible for one controller to control multiple devices.

Initially, before a business context is received, the controller of the device agent will be a default controller used with the type of device. By way of example, for a battery or a PV system the default may be self reliance. For a small industrial load a PID controller maximizing production may be used.

As will be appreciated by those of skill in the art, it is actually the device agent running on the local computing hardware that establishes communication with the service manager or with another device agent and performs steps rather than the actual energy load, source or battery itself, although the following often simply refers to "the device" for simplicity.

Operational Flow—Self-Reliance Context

Figure 3:
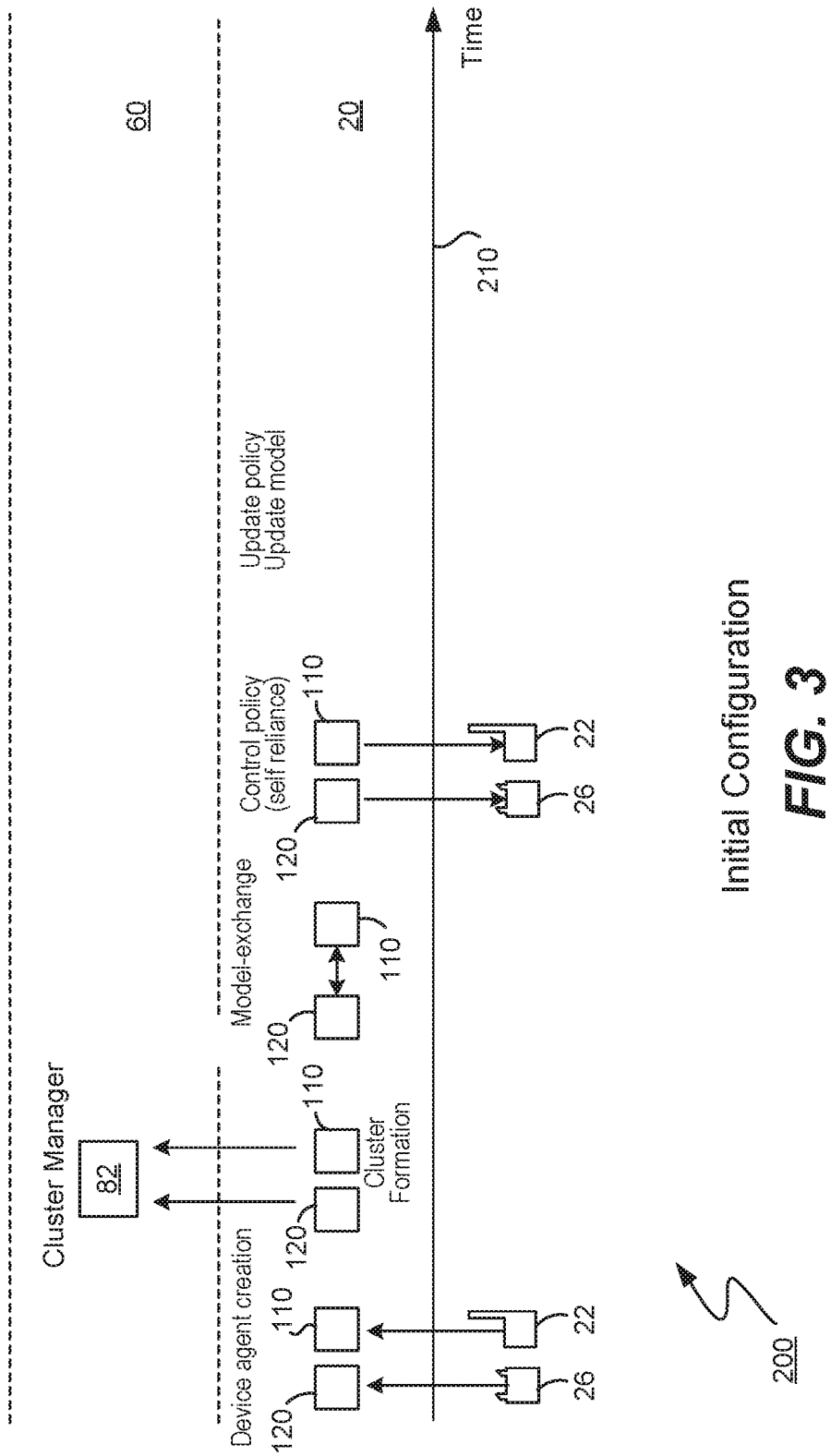
FIG. 3 is a block diagram of a conceptual view of an initial configuration of devices in a pool of a demand-response system that operates without a connection to, or input from, a service manager.

FIG. 3 is a block diagram 200 of a conceptual view of an initial configuration of devices in a cluster of a demand-response system that operates without a connection to, or input from, a service manager 92. In this embodiment, two devices 22 and 26 are configured and placed into a cluster as will be described in FIG. 4. Shown is a timeline 210 and physical layer 20 and virtual layer 60. Device agents 110 and 120 are spawned in a first step; they form a cluster in a second step (this may also be done using models), and exchange models in a third step. Next, a local control policy is followed (typically in a self-reliance context) that uses a model from another device or devices in the cluster. The policy, cluster or models may be updated in a final step. This initial configuration may also encompass a pool of devices such as devices 22-52, or a greater number of devices.

Figure 4:
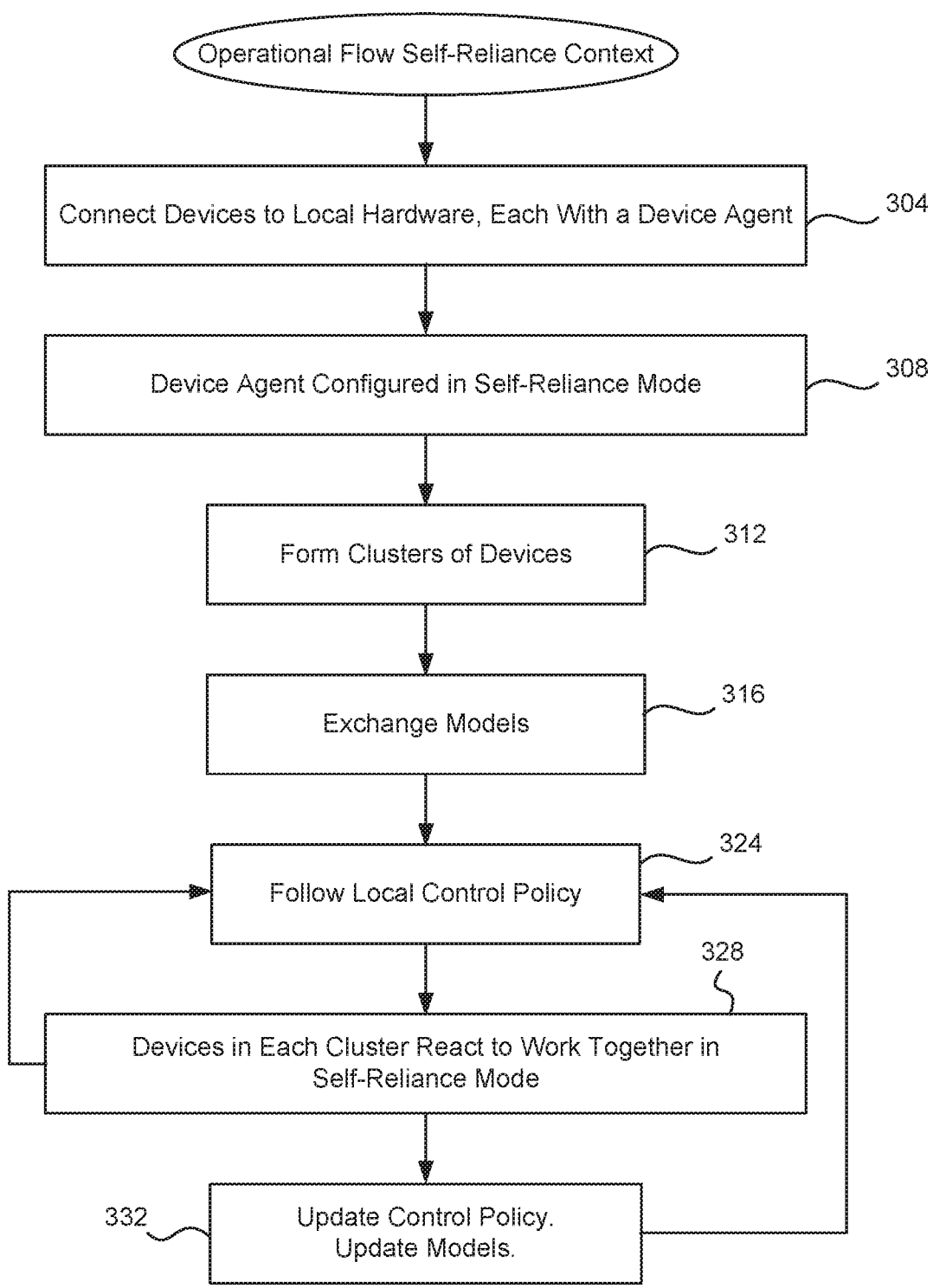
FIG. 4 is a flow diagram describing how any number of devices in a pool may be configured, form a cluster or clusters, and each begin following a control policy without needing communication from a central entity such as service manager or other.

FIG. 4 is a flow diagram describing how any number of devices in a pool may be configured, form a cluster or clusters, and each begin following a control policy without needing communication from a central entity such as service manager 92 or other. This flow may be used when devices first begin to function, when communication is lost with a central entity, or upon an explicit command from the service manager (after which no input is needed from the service manager in order for the devices to follow their control policies).

The flow below uses the example of FIG. 2 although any number or type of devices may be used to create a demand-response system as described below.

In a first step 304 each device (e.g., load, source, or battery) is connected to local computing hardware on which exists device agent software and a controller. On each hardware a device agent is spawned which begins executing. Typically there will be one device per device agent, although it is possible that one device agent may control multiple devices (such as a residence with one computer that controls a PV system and a battery). The controller executes under the device agent.

Each device agent will be pre-programmed in step 308 to be in a self-reliance mode upon initial startup, i.e., without needing external input or control from a central entity, and, being as independent as possible from an energy perspective in combination with other local devices. A device agent in self-reliance mode is most meaningful when its forms a cluster with another device or device; a single device would typically not run in self-reliance mode by itself. One exception is that a device agent that controls more than one device may run in self-reliance mode if its devices are in the same cluster. Devices in self-reliance mode will typically seek out other devices with which to form a cluster.

In an alternative embodiment, when communication is lost with a central entity (e.g., during a natural disaster) each device agent is also preprogrammed to fall back upon the self-reliance mode. In another alternative embodiment, each device in the pool receives an explicit business context from the service manager 92 to run in self-reliance mode (e.g., if the service manager decides that energy prices on the wholesale market exceed those resulting from peer-to-peer interactions). After this input, though, the devices do not receive any input or control from the service manager while they control themselves (until such time as communication with the central entity is restored). All of these embodiments can effectively result in a set of micro-grids that will interact amongst themselves (a so-called "no-wire alternative").

In any case, self-reliance mode may be a preprogrammed default strategy that uses, e.g., a proportional integral, rule-based or model predictive controller whose objective is to minimize the energy entering and leaving the cluster while meeting all constraints of the devices in the cluster (for example, by storing excess production in the cluster and retrieving an energy deficit from storage of the cluster). This objective may be implemented in different ways, e.g., by adding a penalty (e.g., extra costs) for exceeding a certain consumption/production level. Other strategies include rule-based control, MPC control or market-based coordination.

In step 312 the devices will communicate amongst themselves in order to form one or more clusters as will be described in more detail below with reference to FIG. 8. In this step, a device is generally looking for another device or devices with which it can operate in self-reliance mode. Advantageously, communication between the devices is peer-to-peer and does not need to go through a central entity, thus providing resiliency against communication failure.

A proximity heuristic may be used to form clusters of devices and is preferably dependent upon the business context. The heuristic can be based upon the actual distance between devices or be based upon complementary energy, or both, that is, an energy consumer seeks out an energy producer, or vice versa, e.g., a net consumer forms a cluster with the closest net producer, or the other way around. In one example, an industrial site includes the devices of FIG. 2, and the industrial load 22 seeks out battery 26 in order to align the consumption of load 22 with the production of battery 26. In another example, a PV system forms a cluster with a battery (perhaps in the same residence) based upon exchanging daily net production or consumption profiles— when the PV system discharges the battery consumes power, at night the battery may be used to power the residence. The devices will be able to run in self-reliance mode once the cluster has been formed and the models have been exchanged. In self-reliance mode one may also update the models.

Once it is agreed to form a cluster, a cluster manager is formed upon any suitable computer and now represents both devices. Once a device has sent a request for cluster formation and it has been accepted (e.g., devices 22 and 26 agree to form a cluster), and because the response of load 22 will depend upon the response of battery 26, and vice versa, mathematical models are exchanged in step 316. In the embodiment described in FIG. 4, clusters are formed and then models exchanged; in an alternative embodiment, models are exchanged first and compared before a decision is made to form a cluster, as is described in FIG. 8. Typically one exchanges models first and then decides how to form a cluster, but in the self-reliance mode it is also possible to form clusters first using a pre-defined heuristic and then exchange models. In fact, it is possible to form clusters in self-reliance mode using a heuristic such as "closest device with complementary energy," exchange models and begin controlling devices without use of FIG. 8.

As is known in the art, a power model of a load, source or battery provides a mathematical description of the device's dynamics in order to mimic the physical dynamics of the device. A model inputs parameters and their possible values. The mathematical model for each device expresses the dynamics of and the constraints on that device; it can be a model based upon simple physics (i.e., first principles) or be a data-driven model such as a neural network (i.e., a Q function may also be considered a model). In the case of a model based upon physics, the model may consist of equations which are exchanged between devices. Data-driven models may be represented in an XML configuration, in JSON format, or in a universal model language. For certain types of devices the model will be simple. By way of example, for a PV system, the model could simply be the current power output. This power can be sent directly to another device in the cluster from the PV system (or from the service manager 92 or cluster manager). Thus, in some situations the model is simply the control action. A model may be sent from one device to the other by: sending the equations that represent the model in terms of dynamics, cost and constraints, or through sending a state action value function.

Thus, the mathematical model 162 of load 22 can then be used in the decision making and control policy of battery 26 and vice versa. Additionally, errors in a model can be exchanged directly between devices, e.g., forecasts errors can be communicated resulting in noise correction.

Figure 13:
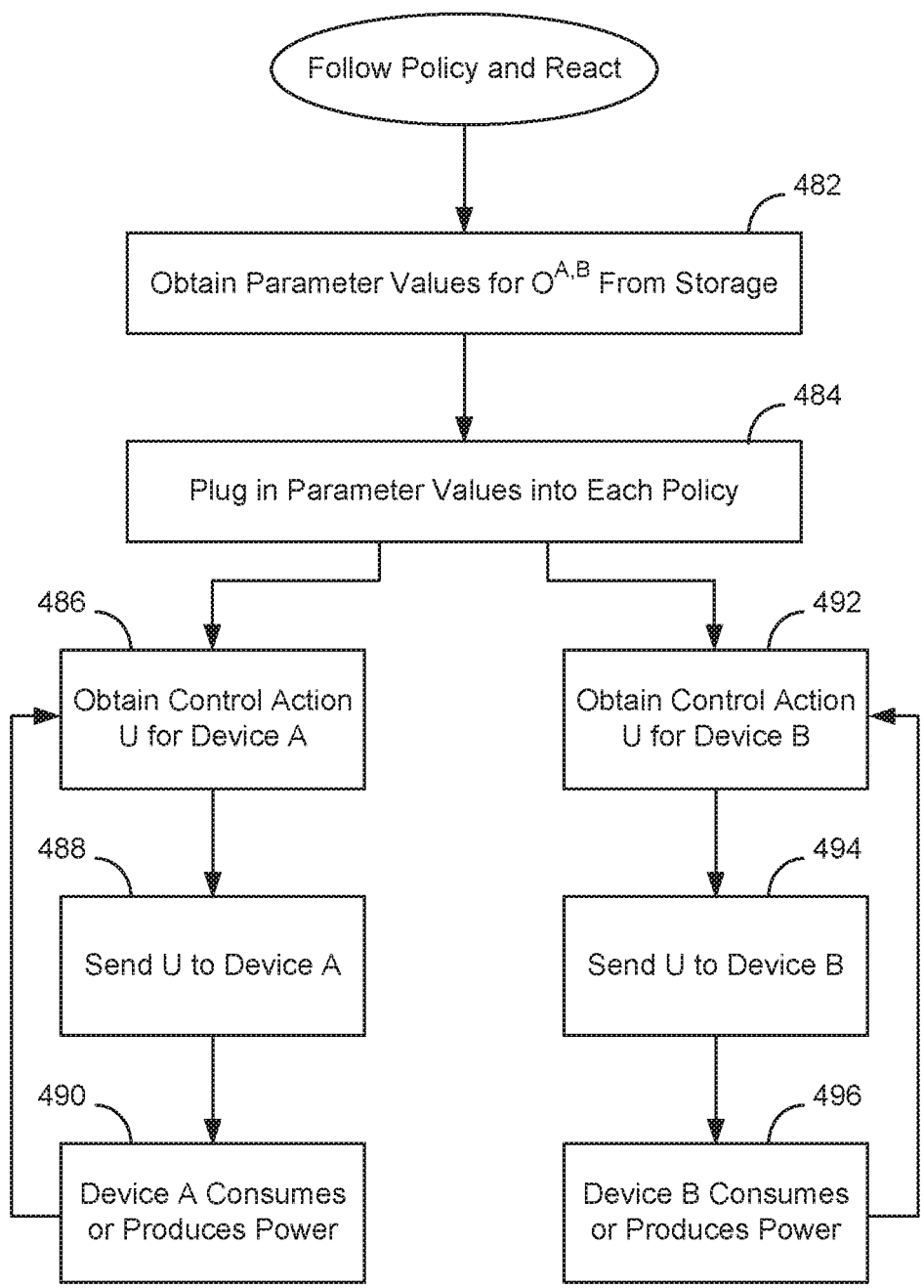
FIG. 13 is a flow diagram describing one embodiment by which each of two devices in a cluster implements their own local control policy in order to work together in combination.

In step 324 each device 22, 26 follows its own local control policy (e.g., 152 and 154) taking into account the model or models received from other devices. In step 328 each device then reacts and all work together to perform in self-reliance mode. Advantageously, all devices will keep working even if there has never been communication with a central entity or if communication is lost. FIG. 13 describes in more detail the steps 324 and 328.

From time-to-time, in step 332 the control policy of a device may be updated or a model of a device may be updated. A battery may start using a generic controller for the battery in step 304, but based upon data collected during step 324 a new control policy may be used. For example, a battery in a cluster with an air conditioning unit of a house may learn over time how long it takes to cool that particular house and may then update its control policy. Also, models may be updated from time-to-time at fixed time intervals or may be event driven.

Consider another example in which a battery, a household load and a PV system all form a cluster in self-reliance mode. The battery periodically receives the model of the PV system (which is its output in time) indicating when the PV system is producing. In order to minimize import or export of energy in the self-reliance mode, when the PV system is producing the battery will consume energy. By contrast, at night, the battery receives an updated PV system model indicating that there is no output; the battery will now produce power in order to satisfy the household load. In this way, the local control policy that the battery follows is influenced by the PV system model.

Operational Flow—New Business Context

Figure 5:
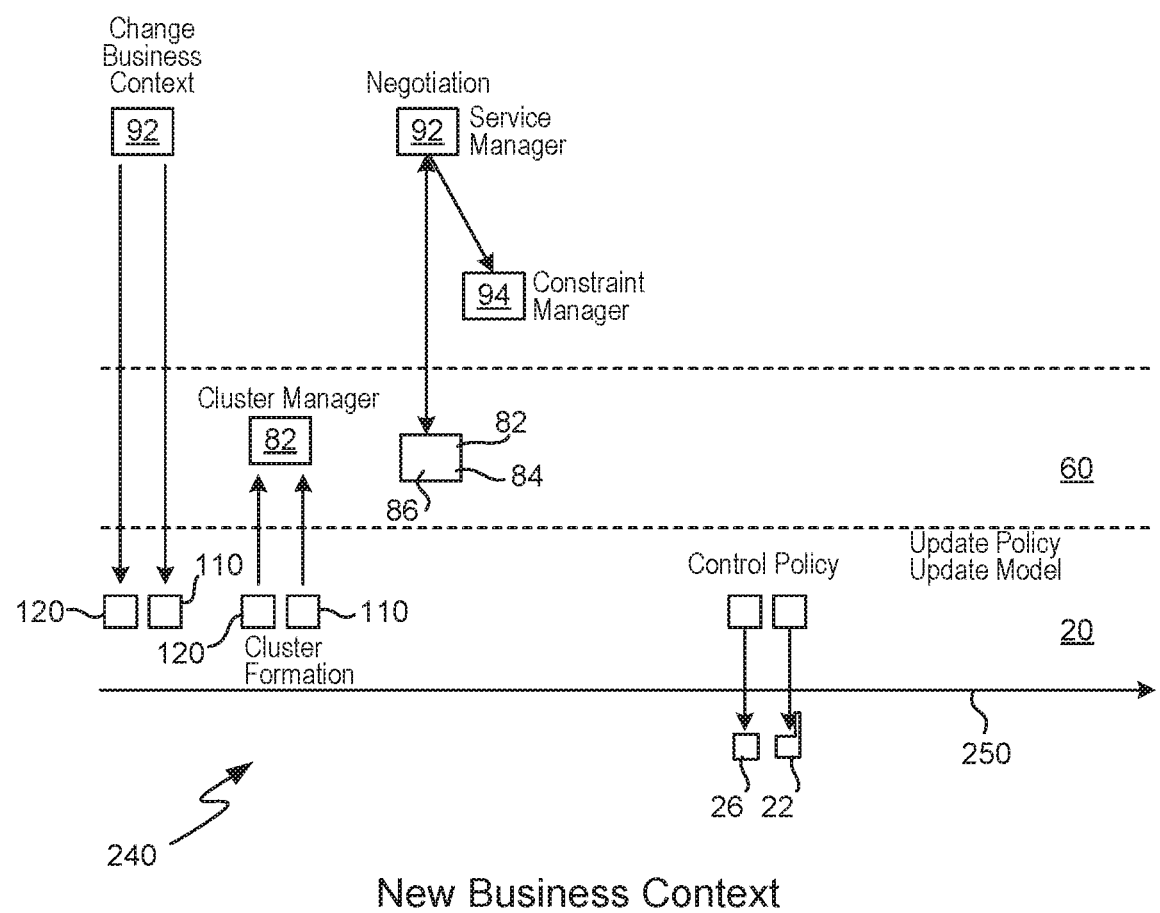
FIG. 5 is a block diagram of a conceptual view of devices in a pool of a demand-response system which receive a new business context.

FIG. 5 is a block diagram 240 of a conceptual view of devices in a pool of a demand-response system which receive a new business context. In this embodiment, the business context is changed and two devices 22 and 26 form a cluster as will be described in FIG. 6. Shown is a timeline 250, physical layer 20 and virtual layer 60. Device agents 110 and 120 receive a new business context in a first step; they form a cluster in a second step during which models are exchanged. In a third step negotiation occurs with the service manager and other clusters 82, 84 and 86. Next, a local control policy is followed (according to the new business context), and the policy or models may be updated in a final step. This process may encompass a pool of devices such as devices 22-52, or a greater number of devices.

Figure 6:
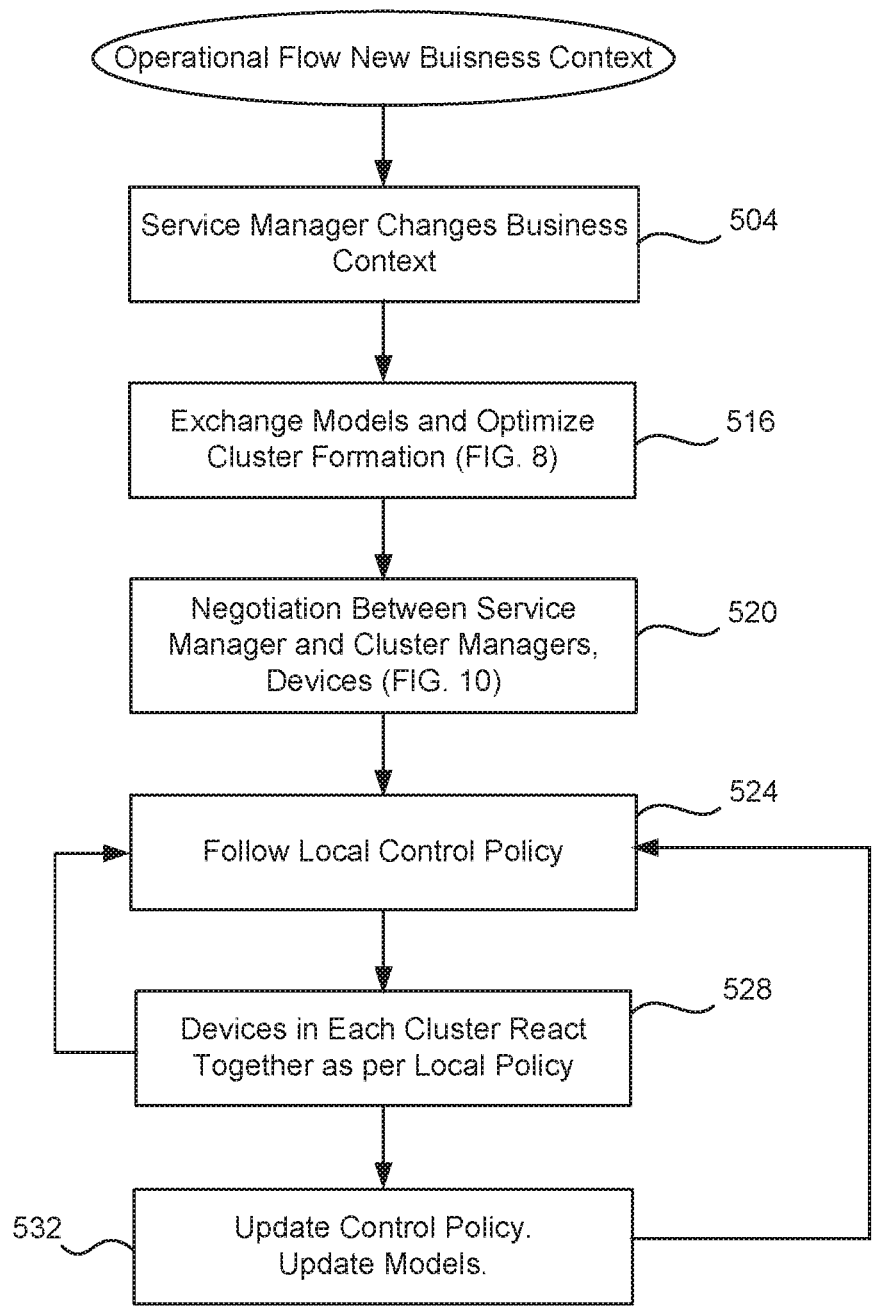
FIG. 6 is a flow diagram describing how any number of devices may form a cluster (or clusters) and then each begin following a control policy after receiving a new business context from a central entity such as service manager.

FIG. 6 is a flow diagram describing how any number of devices may form a cluster (or clusters) and then each begin following a control policy after receiving a new business context from a central entity such as service manager 92. This flow may be used when devices first begin to function or typically after the devices have been running and a new business context is received. Thus, from time to time, the aggregator decides to change the business context of the devices in a pool in order to provide a different service to a system operator or a balancing responsible party. New clusters are formed using heuristics dependent upon the new business context, and instead of a self-reliance objective the objective of a cluster may be to bid in as much power for frequency control as possible (for example).

In step 504 the service manager changes the business context and sends the new context to each device agent in the pool. A variety of business contexts may be used, such as: self-reliance, frequency control (FCR, dFFR, etc.), signal tracking, voltage control, congestion management, portfolio balancing, etc. Each context will typically have a requirement The service manager sends a package of information corresponding to the new business context to each device agent. By way of example, for frequency control, the package includes: constraints such as the ramp rate required (e.g., 10 seconds), how long to sustain, energy constraints; and other information such as actual historical samples that the asset can be exposed to. For self-reliance, the package includes information such as an objective function that penalizes the use of energy not produced locally or in the cluster in which the device agent is active, or production of energy outside of that cluster. Typically, the package will include the requirements of the context. Thus, each device agent receives enough information in order to know how to bid in the current business context without needing further input from the service manager.

In order to change the mode of each controller based upon the business context, different parameters may be sent in the case of PID or rule-based controllers. In the case of an MPC controller, for example, the mode may be changed by changing its objective, changing a constraint, or changing the model. Or, many controllers may be sent to the device agent and changing the mode entails choosing one of the controllers at the device agent. Or, a block of software at the device agent representing the old controller is swapped for a new block of software that represents the new controller. Typically, one controller will be deployed to the device agent, and the mode may be changed by changing a reward function or objective function of the controller.

In step 516 heuristics are used to determine candidate devices for a particular cluster, models are exchanged and clusters are optimized, as will be described in greater detail below in FIG. 8.

In step 520 a negotiation occurs between service manager 92, constraint manager 94, individual devices, and any number of cluster managers, such as managers 82, 84 and 86. This is a negotiation between all clusters and devices which have agreed to provide a particular service in order to determine how best to provide that service to the aggregator. The goal is to obtain a consensus among the clusters and the service manager; techniques from distributed optimization may be used and this step is described in greater detail below in FIG. 10. In frequency control, one particular example is that each cluster manager and standalone device calculates which part of the droop curve it can provide (and each provided part may be nonlinear), and then negotiates with the service manager in order to provide a linear droop curve based upon all clusters and standalone devices in the pool.

In step 524 each cluster or device follows its own local control policy taking into account the model or models received from other devices. In step 528 each device then reacts and all work together to provide the service in the current business context. FIG. 13 describes these steps in more detail.

From time-to-time, in step 532 the control policy of a device may be updated or a model of a device may be updated.

Cluster Formation

Figure 7:
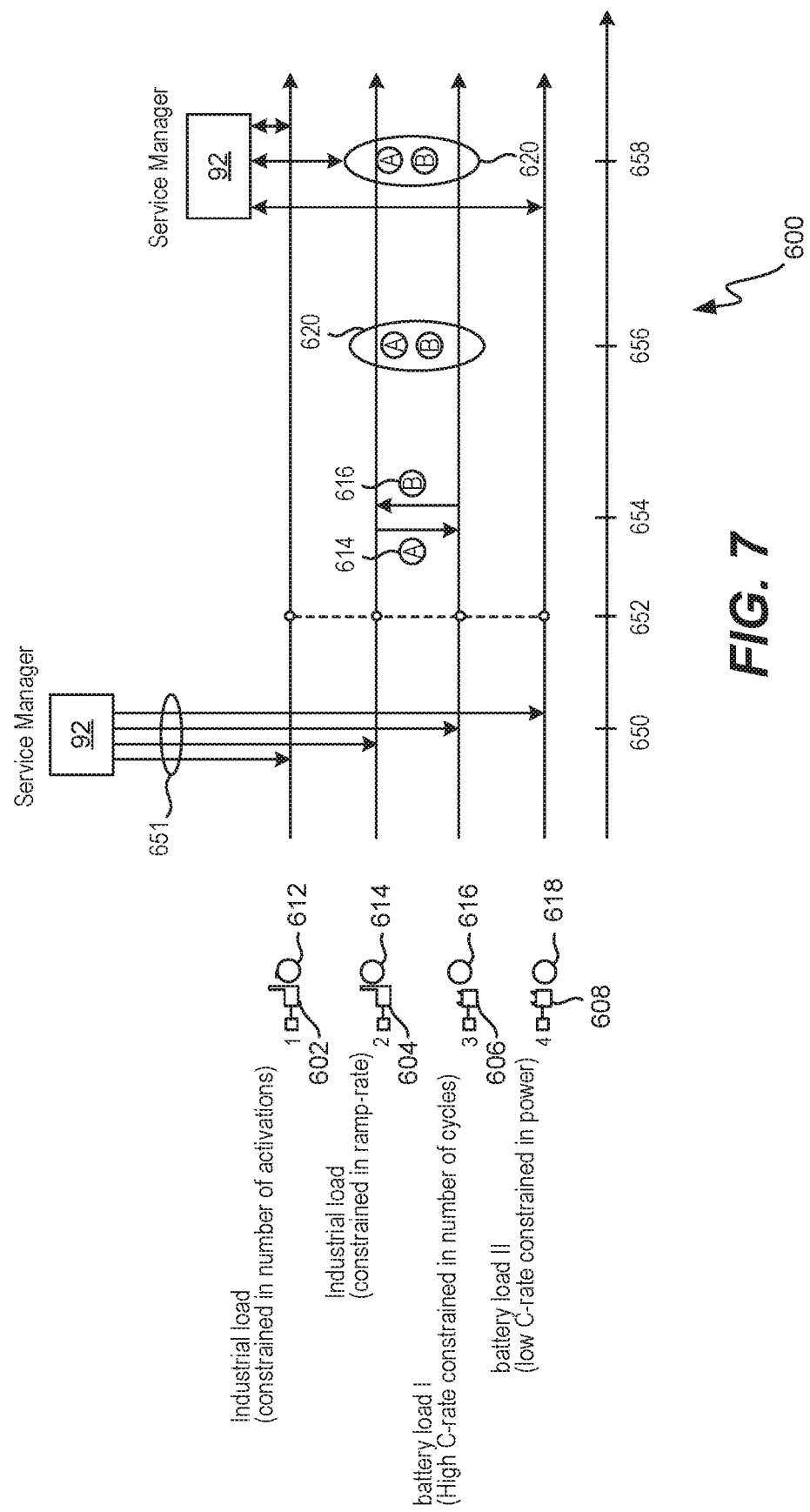
FIG. 7 is a specific example of how two devices form a cluster and provide a service after receiving a new business context and exchanging models.

FIG. 7 is a specific example 600 of how two devices form a cluster and provide a service after receiving a new business context and exchanging models. Cluster formation is described in more detail below in FIG. 8. Shown are loads 602, 604, and batteries 606, 608 and their corresponding models 612-618. Each load or battery is also connected to local computing hardware 1-4. Generally, any number of energy loads, sources or batteries will determine that if by working together (i.e., by adapting their control policy based upon an understanding of what the other devices will do) they can make more revenue (or other type of value) relative to working alone under the current business context (such as frequency control, etc.). As described below, load 604 and battery 606 will form a cluster 620.

At time 650 service manager 92 has changed the business context to frequency control (for example) and sends a communication indicating that change to each of devices 602-608 via their corresponding local computing hardware 1-4 as indicated by signals 651. Next, at time 652 a heuristic is used that decides with which other device or devices a certain device may wish to form a cluster. In frequency control, for example, where a cluster with a fast-slow combination is desirable, a slow device, load 604, desires to form a cluster with a fast device such as a battery using the c-rate (the c-rate being the nominal power of the battery divided by the nominal energy content) of the battery as a heuristic. Thus, device 604 will look for batteries ranked by their power/energy ratio.

Now that the two devices 604, 606 have determined that they may wish to form a cluster with one another they exchange models at time 654. Next, at time 656 the two devices perform an optimization that calculates the potential of a combination of the two devices operating together. This calculation may be performed at each device, at only one device, or at a micro server on a cloud computing platform. If the devices agree to form a cluster, then a cluster manager is spawned to represent the two devices. Next, at time 658 cluster 620 and devices 602 and 608 negotiate with the service manager in order to optimize the service at the pool level. Thus, a device need not join a cluster in order to participate in the service at the pool level.

Figure 8:
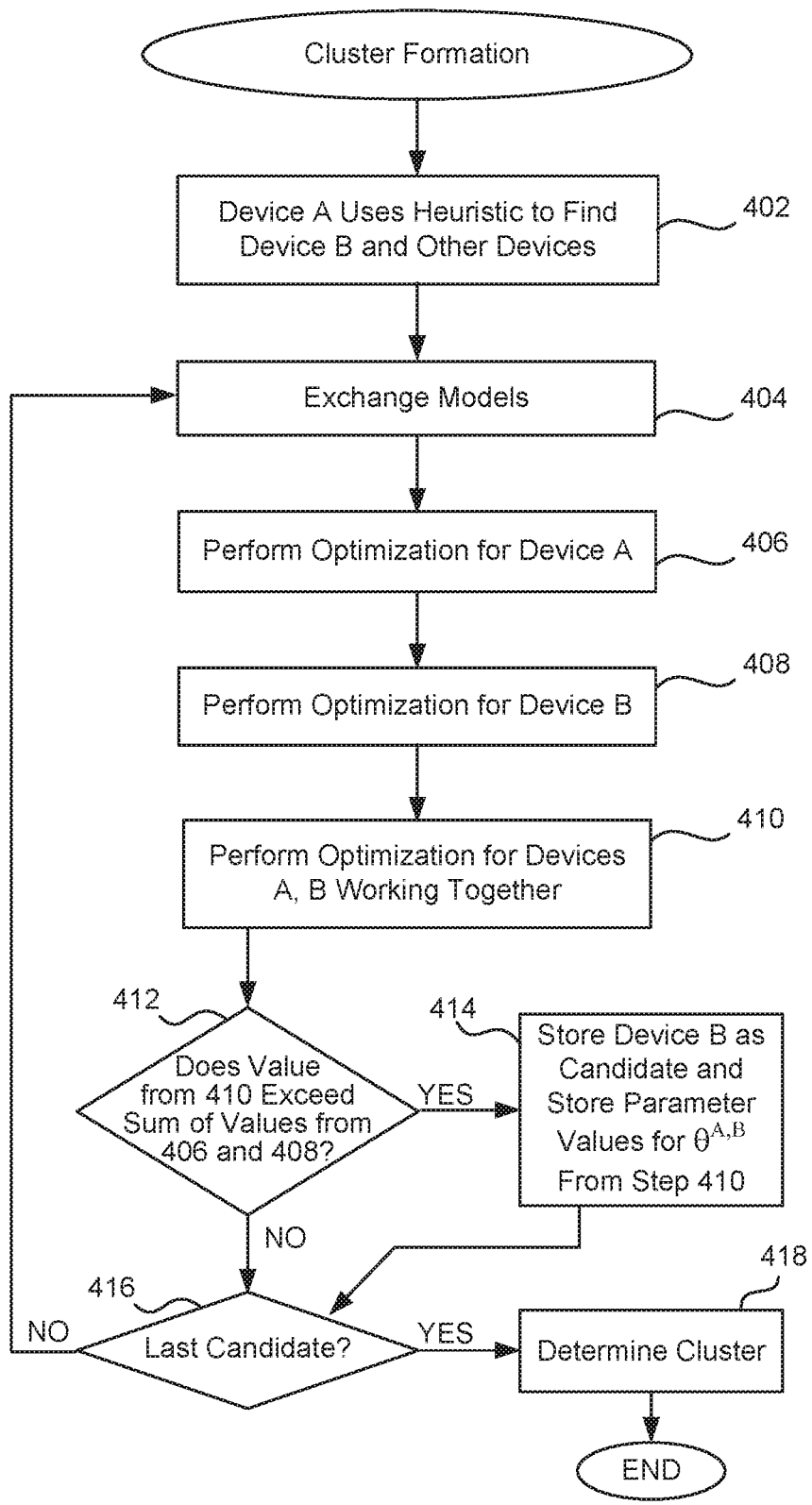
FIG. 8 is a flow diagram describing one embodiment by which two devices may form a cluster.

FIG. 8 is a flow diagram describing one embodiment by which two devices may form a cluster. This flow may be used to implement steps 312-316 of FIG. 4 (in the alternative embodiment in which models are exchanged first in order to form a cluster) or step 516 of FIG. 6 and is suitable for any of the business contexts described herein. In the below example a device A is looking for a suitable device with which to form a cluster, for example, a slow device maybe looking for a suitable battery with which it can work in combination to perform frequency control. Of course, each device in a pool may be performing the below flow in order to find a suitable partner. In this example, device A takes the lead and makes a decision about with which device it should form a cluster, although in an alternative embodiment, each device must agree before a cluster is formed.

In a first step 402 a device A (such as any of the devices shown in FIG. 1) uses a suitable heuristic to find a candidate device B (or perhaps any number of candidate devices). Examples of heuristics are presented above and one of skill will be able to devise a particular heuristic based upon a business context. Other examples of heuristics for other contexts include: using the c-rate of a battery as a measure of the need for extra energy, using the actual distance between devices in the case of self-reliance, and using the historically-averaged net production/consumption profile of a site and check for a match with its own historical profile.

In fact, most all energy devices that can be controlled will have inherent constraints, such as the maximum energy of a battery, the maximum or minimum temperature of a hot water heater, the ramp rate of an industrial oven, the number of hours each can be called upon to provide power, etc.

These constraints can prevent a device from participating in some of the business contexts, e.g., for frequency control a device needs to be able to reach full power in about 10 seconds; a slow device is not able to meet this requirement because of a constraint on its ramp rate. Or, batteries are energy constrained, hence they may take this into account when participating in frequency control and forming a cluster. The invention leverages these constraints by pairing devices that complement each other, e.g., a slow non-energy constrained device is paired with a fast energy-constrained battery, thus offering more power to the market relative to stand alone operation for each of the devices. A device uses a suitable heuristic to find a complementary device based upon the constraints of each device; each device is aware of its own constraints. Further, once more data becomes available a machine-learning method (such as a neural network) may be used by a device to learn which types of devices are more suitable for forming a cluster. This may result in faster and more efficient cluster formation.

In step 404 the two devices exchange models (device A and the first or next candidate device). The exchange of models may be performed in different manners. Each device may send its model to the other device, only one device may send its model to the other device (in which case both models reside at one of the devices), or each device may send its model to a third-party computer (such as a computer local to one of the devices, one of the existing cluster managers 82-86, the service manager 92, a micro server located at a cloud service, or other). In any case, the result is that both models now exist on at least one computer (and perhaps on both computers of the two devices) so that the below optimizations and comparison may be performed. If a third party computer performs the optimization, then that computer operates as a broker between the devices, taking in models from the devices and deciding if a cluster should be formed or not. If the computer is the local computing hardware, then one of the device agents will then decide if a cluster should be formed or not. Step 404 may also be performed after steps 406 and 408.

The below steps describe a particular optimization that may be performed in order to determine the potential of the combination of two devices. Another embodiment is described in "*Robust Energy-Constrained Frequency Reserves from Aggregations of Commercial Buildings*," by Vrettos, Oldewurtel and Andersson, which is hereby incorporated by reference. Types of optimizations (other than maximizing monetary value in the context of frequency control) that may be used include: reduction of $CO_2$ or Nox, reduce energy losses (kWh) in the system, satisfy a particular technical constraint of a device or of an external constraint.

In step 406 an optimization is performed to determine the value received by device A should it operate standalone in the current business context. Various optimizations may be used each having different units indicating the value of the optimization. In one specific embodiment, the function "f" is based upon the monetary value that the device would receive operating standalone or in combination, which is typically maximized. In the business context of frequency control, "f" is the objective function, namely power that can be bid in multiplied by price. In the context of self reliance, the objective is to minimize the energy flowing in and or out of the cluster. One way of doing this is by using the equation: min|$P_1+P_2+P3$|, when three devices are forming a cluster (as described below). Other optimizations and units that may be used include those mentioned above.

In this embodiment, a formula for the optimization of device A, its constraints and an explanation of the terms used can be found below. Other optimization techniques may also be used. And, as is known in the art, the optimization technique may depend upon whether a model is linear or nonlinear. In the formula, "O" represents the result of the optimization such as maximum revenue, minimum cost, carbon dioxide saved, etc. The variable "$x_A$" represents the states of device A and "$\theta_A$" represents the parameterization of the control policy of device A. Functions "g" and "h" are each constraints, "g" being an inequality constraint and "h" being an equality constraint. By way of example, "g" may require that the energy state of a battery be between 0 and 10 MW-hours, or that the ramp rate must be larger than a quantity. Constraint "h" is an equality constraint such as the energy of a battery at time t must be equal to the energy of the battery at time t–1 plus the energy added. Of course, a minimizing optimization formula may be converted to a maximizing optimization formula by placing a "–" minus sign in front.

$$O_A^* = \min_{\theta_A} f_A(x_A, \theta_A)$$

subject to: $g_A(x_A, \theta_A) \leq 0$ $h_A(x_A, \theta_A) = 0$

In step 408 an optimization is performed to determine the value received by device B should it operate standalone in the current business context. The same optimization technique used for device A may also be used for device B. In this embodiment, a formula for this optimization of device B, its constraints and an explanation of the terms used is below. It is also possible to use a different optimization technique for device B, as long as the optimization objective is the same, e.g., the optimization technique LP is used for device A while gradient descent is used for device B.

$$O_B^* = \min_{\theta_B} f_B(x_B, \theta_B)$$

subject to.: $g_B(x_B, \theta_B) \leq 0$ $h_B(x_B, \theta_B) = 0$

In step 410 an optimization is performed to determine the value received should device A and device B operate in combination in the current business context. The same optimization technique used above will also be used in this step. A formula for this optimization, its constraints and an explanation of the terms used is below. Because the behavior of device A will depend upon device B (and vice-versa), the cost function for A (and constraints) will depend upon the behavior of device B. It is also possible to use a different optimization technique for devices A and B combined, as long as the optimization objective is the same, e.g., the optimization technique LP is used for device A while gradient descent is used for devices A and B.

$$O_B^*, O_A^* = \min_{\theta_B, \theta_A} f_B(x_B, \theta_B, \theta_{A,}) + f_A(x_A, \theta_B, \theta_{A,})$$

subject to.: $g_B(x_B, \theta_B, \theta_{A,}) \leq 0$

-continued $$h_A(x_A, \theta_B, \theta_{A_z}) = 0$$

$$g_B(x_B, \theta_B, \theta_{A_z}) \leq 0$$

$$h_B(x_B, \theta_B, \theta_{A_z}) = 0$$

In step 412 it is determined whether the value from step 410 exceeds the sum of the values from steps 406 and 408. If so, this indicates that the two devices working in combination would receive more total value than if each of them operated in a standalone manner. Accordingly, in step 414 this device B is stored as a viable candidate device in memory or storage of the computer performing these calculations (such as at device A). In addition to storing an identification of the candidate device, the actual parameter values from the optimization of both devices in step 410 are stored. In other words, the parameter values for both devices A and B for the configuration θ of each control policy that resulted in the optimization are also stored for future reference.

Next, or if the answer to the query in step 412 is in the negative, step 416 checks whether or not there are any other candidate devices that were also found in step 402. If so, then control returns to step 404 and the process is executed again for the next candidate device or devices found in step 402. If not, control moves to step 418 and device A determines to form a cluster with one of the candidate devices that it has stored. If no candidate devices were found then no cluster will be formed. If there are many candidate devices then the candidate device with the highest value from step 410 will be chosen, or if only one device, then that device will be chosen. It is also possible that device A will choose to remain standalone, even if candidates have been found. In this example, step 418 determines that device A shall form a cluster with device B and a cluster manager will be spawned on a suitable computer.

In other embodiments, device A may choose to end the iteration and determine a cluster in step 418 before all candidate devices have been optimized and these reasons include: device A runs out of time, device A finds a candidate device that satisfies a minimum threshold in step 412, or no better candidate has been found in the last pre-defined number of rounds. Alternatively, if both devices must agree before a cluster is formed, then device B must also agree before the cluster is formed. Device B may do so simply on recommendation from device A (device B not having the model for device A), or, device B may also perform any or all of steps 406-416 (device B having the model of device A) before agreeing to from the cluster.

Once it is determined to form a cluster, the control policy of device A will be modified to incorporate and use the model of device B (and vice versa). The results of the optimization described above will be used to define the control policy as described in steps 414 and 482-484.

If the models were not exchanged between the two devices in step 404 (because only one device received both models or because a third party performed the optimization), then the models may be exchanged at this point in time so that each device has a model of the other so that it may perform the optimization of step 410. An exchange of models is not strictly required as long as step 410 can be performed on a computer.

The above describes how a cluster of two devices may be formed. In order to form clusters of three or more devices, one preferred approach is that device A looks for clusters of other devices in step 402 as well as simply looking for a single device. The above steps may then be performed in which a cluster takes the place of device B. Or, a cluster of devices will look for a single device B, or will look for a cluster of devices.

It is also possible to perform the above flow diagram for three or more devices at once, e.g., perform optimizations for each of devices A, B and C standalone, and then performing an optimization for all devices in combination. This may be performed by using the above technique.

Coordination of Clusters—Consensus Building

Figure 9:
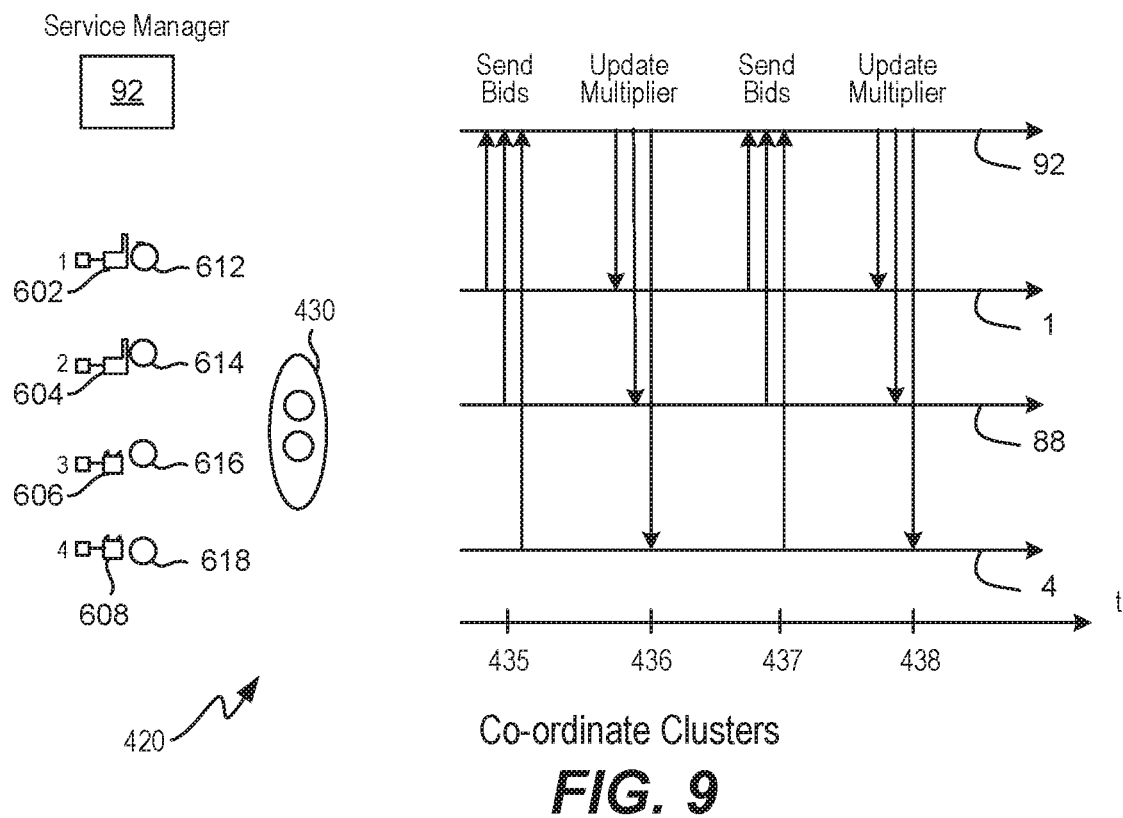
FIG. 9 is a block diagram with a timeline illustrating how any number of cluster managers or standalone devices coordinate with a central entity such as service manager in order to build consensus in a particular business context.

FIG. 9 is a block diagram 420 with timeline illustrating how any number of cluster managers or standalone devices coordinate with a central entity such as service manager 92 in order to build consensus in a particular business context. This diagram and the below flow diagram describe in more detail the negotiation of FIG. 5, step 520 of FIG. 6 and 658 of FIG. 7.

Shown are any number or types of energy devices 602-608, their corresponding models 612-618, and respective local computing hardware 1-4. Devices 604 and 606 have formed a cluster 430, represented by cluster manager 88, while devices 602 and 608 remain standalone. Of course, other permutations of devices are possible: all devices may be represented by cluster managers, or there may be a mix of clusters and standalone devices as shown. Also shown is a timeline from left to right in which each device or cluster first sends a bid to service manager 92 at 435, which responds by updating the multiplier used at 436, followed by updated bids being sent to the service manager at 437, the multiplier being updated again at 438, etc., in an iterative process as will now be described immediately below.

Figure 10:
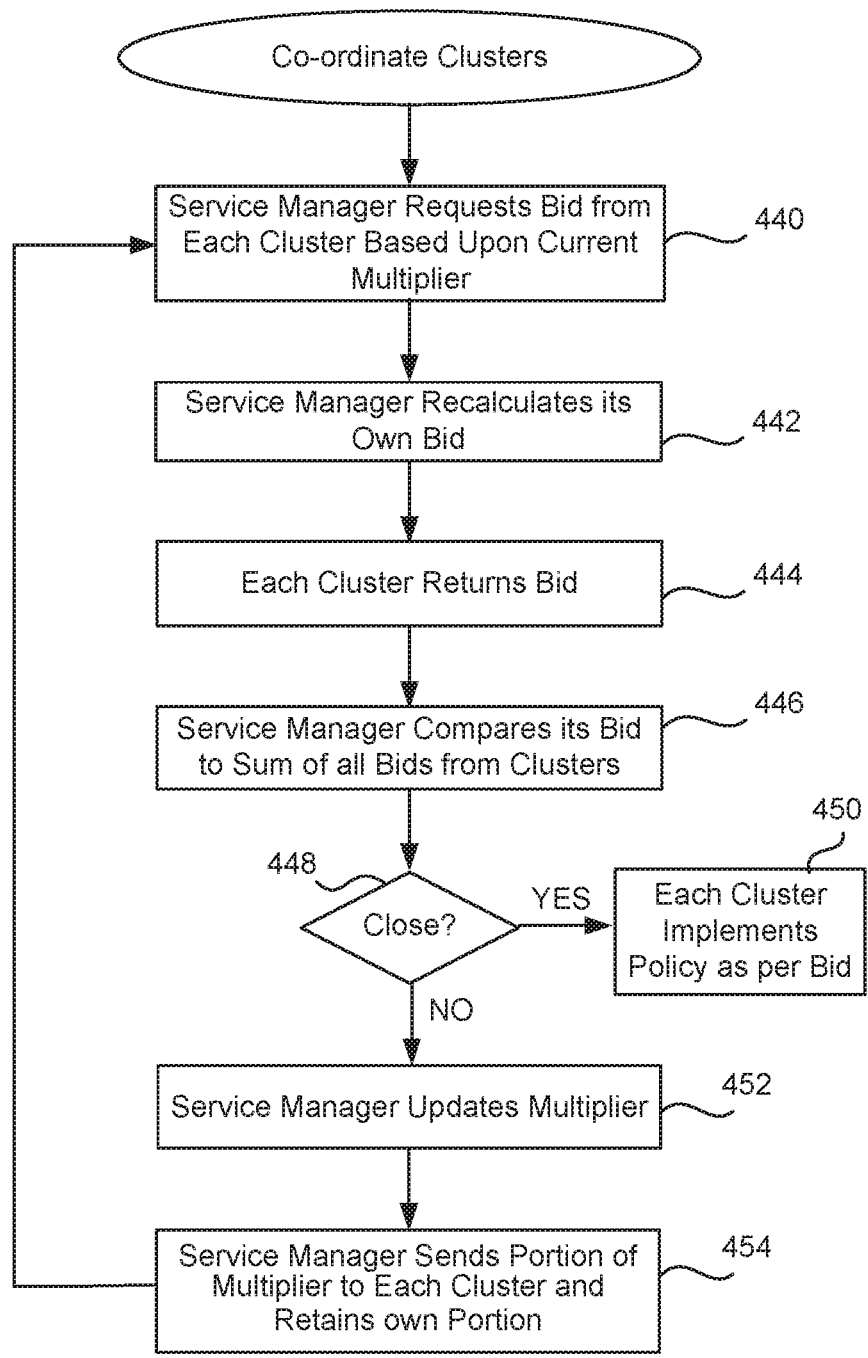
FIG. 10 is a flow diagram describing how any number of clusters or standalone devices negotiates with the service manager in order to build consensus regarding a response in a particular business context.

FIG. 10 is a flow diagram describing how any number of clusters or standalone devices negotiates with the service manager in order to build consensus regarding a response in a particular business context (previously sent to the devices or cluster managers in step 504). The optimization used by the service manager optimizes the total objective of all clusters subjective to the constraint of the service to be provided. A constraint manager 94 may also participate in the process providing values for these constraints. In this situation, the constraint manager in step 452 passes its constraints to the service manager in order to update the multiplier.

In a first step 440, the service manager requests a bid from each cluster manager (or device) based upon the current multiplier and a particular business context, such as frequency control. In the context of frequency control, the service manager is requesting a droop curve from each cluster or device, while in the context of congestion management a forecast power vector is being requested. In other contexts the bid from each cluster manager or device may be a collection of power vectors each with a probability or a range in which power can be expected, e.g., between −1 and +1 kW.

As known in the art, a multiplier is typically a vector, such as a Lagrange multiplier, that provides a shadow price (for example) to each cluster manager; initially, this multiplier is typically zero. Basically, the multiplier provides an incentive for each cluster manager or device to change its behavior, or bid. The multiplier may represent a monetary value, a value representing carbon reduction, a value representing excess production, all values that are desirable by each cluster manager or device. As known, the multiplier will have the same dimension as the bids, e.g., the same number of elements. This process may be triggered by the service manager or by any of the cluster managers or devices.

In a next step 442 the service manager will also recalculate its own bid based upon the current multiplier, for example, in the context of frequency control, the service manager presents a bid which is a linear response having an optimal angle to a frequency change.

In a next step 444 each cluster manager or standalone device will return its bid to the service manager. In step 446 the service manager then compares its bid to the sum of all bids from the cluster managers and devices. By way of example, comparison may be performed by taking the absolute value of the difference between the two quantities or by taking the quadratic difference between the two quantities.

In step 448 if the two quantities are close enough then the service manager determines that a suitable consensus has been reached in order to respond to the service, and in step 450 each cluster manager or standalone device will implement its local control policy as per its last submitted bid. The two quantities may be determined to be close enough if there is no significant change from the last comparison, e.g., less than 1% change, less than 0.1% or another suitable value for epsilon; one of skill in the art will be able to choose a suitable value for epsilon. In the context of frequency control, the service manager is looking for a combined droop curve from the clusters and devices that is essentially linear, while in the context of congestion management the solution should match a grid constraint such as a power rating of a cable. In other contexts, in general, the service manager is looking for quantities that are close enough as measured by the Frechet distance, or by a vector x and y, |x−y|/x.

On the other hand, if the quantities are not close enough, then at step 452 another iteration begins and the service manager updates the current multiplier by taking the old multiplier and adding new values for each element to create a new, current multiplier. An update of the Lagrange multiplier is typically done by:

$$\lambda_{new} = \lambda_{old} + \alpha(P_A - P_B)$$

with $P_A$ and $P_B$ sum of all bids from the clusters and that of the service manager. Note that this is in the context of frequency control; for other objectives one of skill in the art will understand that these updates refer to the coupling constraints of the optimization problem.

Next, in step 454 the service manager sends the relevant portion of the multiplier to each cluster or device and retains its own portion. As is known, only certain portions of the multiplier are relevant to the constraints of a particular device or cluster manager. Next, flow returns to step 440 where the iteration begins again and the service manager requests bids.

FIG. 11 is a diagram illustrating how any number of cluster managers or standalone devices coordinate with each other using a distributed architecture 460 in order to build consensus in a particular business context without interacting with a central entity. In contrast with FIGS. 9 and 10 which describe the use of a centralized architecture in which negotiation occurs with a central entity, distributed architecture 460 is able to build consensus without the use of a central entity such as service manager 92. This architecture is useful if communication with the central entity is lost or if it is desirable to build consensus without that entity. Included within architecture 460 are cluster managers 82-86, and any number of energy devices, for example, devices 462-466. As long as a device is able to communicate with at least one other device or cluster in architecture 460, it will be able to help build consensus. These devices communicate with one another using communication links 471-475 which may be any suitable communication means such as is described above.

Each device in the architecture is aware of the current business context (based upon a prior communication from service manager 92), and each device will spawn a dedicated service manager process on its local computing hardware in order to represent the interests of the service manager at each device. Each such service manager process is aware of all details that the actual service manager 92 is aware of, such as: what the service manager would bid in a particular business context, which multiplier shall be used, how to update the multiplier, and how to recalculate the service manager bid. For example, at each device or cluster a service manager is spawned, this manager may actually be a clone of the service manager used in the centralized approach. The central service manager has sent a black box algorithm to each device agent or cluster manager; this algorithm is sent every time the central service manager has a new business context or wants to switch the operational use.

In order to build consensus amongst the various clusters and devices of architecture 460 any suitable peer-to-peer consensus-seeking technique may be used, such as the ADMM (Alternating Direction of Multipliers Method) technique, or other techniques such as D-ADMM, column generation, dual decomposition, etc. Using the D-ADMM technique, for example, the flow of FIG. 10 is followed, except that each service manager process on a given device or cluster replaces the central service manager. Thus, steps 440-452 are performed in which the service manager process of cluster 82 performs the role of service manager—requesting bids from clusters 82 and 84. When the service manager process sends the updated multiplier in step 454, it is only sent to cluster 82 which then updates its own bid. Steps 440-452 and 454 are then performed from the point of view of device 462. In a similar fashion, device 466 and cluster 86 each perform steps 440-452 and 454 with battery 464, each updating their own bid. Next, these steps are implemented from the point of view of the service manager process on cluster 84, which collects bids from cluster 82 and devices 462 and 464. Similarly, device 464 will also perform these steps. Thus, iteration occurs (which does not need to be sequential as described) using this peer-to-peer consensus-seeking technique until a consensus is reached as described in step 448. Of course, other such techniques may be used and one of skill in the art will be able to implement any of these techniques upon a reading of this disclosure.

Real-time Control of Devices and Flow Diagram

Figure 12:
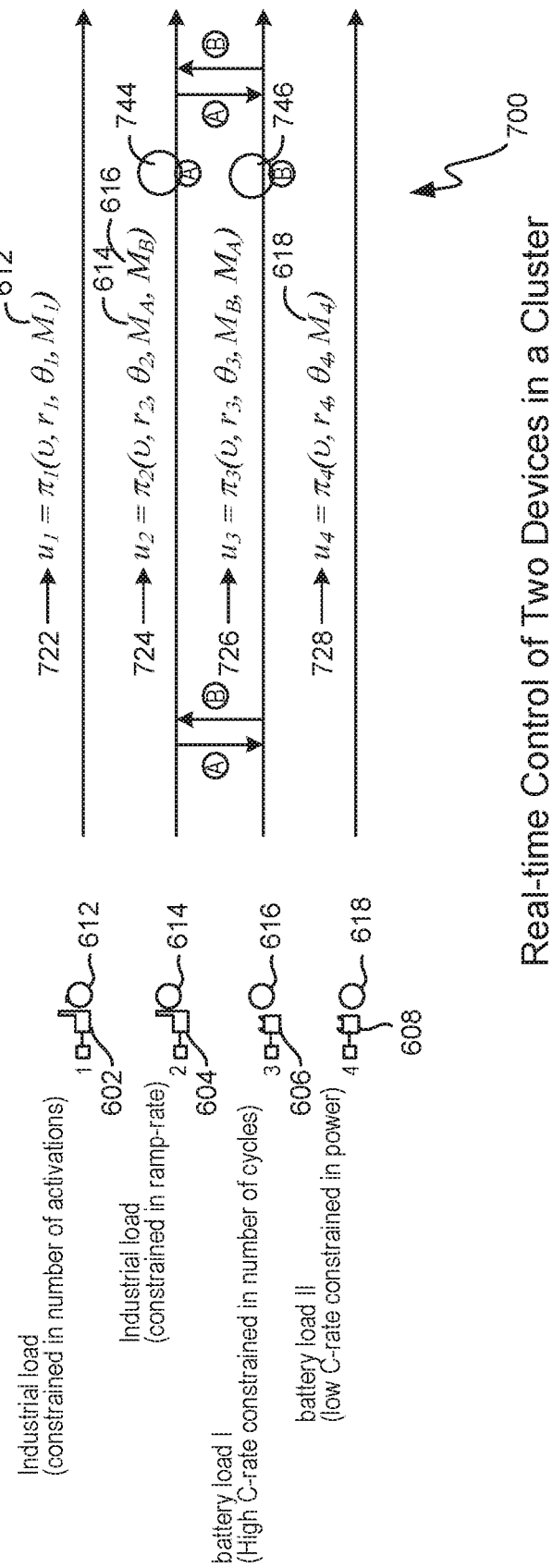
FIG. 12 is an example showing how real-time control of two devices in a cluster may occur.

FIG. 12 is an example 700 showing how real-time control of two devices in a cluster may occur, and shows how steps 324-328 and 524-528 may be implemented. Real-time control results in active (and/or reactive) power that is consumed and/or produced by an energy device. This power is calculated on the local computing hardware connected to the device, following a control policy 7E of that device. For devices that are not in a cluster, they react to the external signal v (this can be a locally-measured signal such as frequency, voltage, renewable production, etc., or a centralized signal such as a centralized set point) according to their own local control policy. For a device in a cluster, it will react according to a policy that is responsive to the state of the other device (or devices) in the cluster where the state (and response) of the other device(s) is estimated using the model of the other device, as will be described below.

As shown in FIG. 12, each control action of devices 602-608, $u_1 \ldots u_4$, is calculated using a policy configured by $\theta$. Where the control action is calculated only as a response to an external event v and an internal state x, the policy uses the local model M to calculate the control action u. For devices 604 and 606 (represented by models A and B) which are in a cluster, the control action also takes into account the model of the other device in the cluster. Models can also be updated and exchanged on a regular basis.

Once models 614 and 616 have been exchanged between devices 604 and 606, each device may follow its own local control policy 722-728. As known, each device calculates a local response to an external event (such as a frequency deviation on the grid at the device) at particular time intervals. As devices 602 and 608 have not exchanged models and are not in a cluster with another device, they will each follow a control policy that depends upon their own corresponding model, namely, 612 or 618.

Devices 604 and 606, though, have exchanged models and have formed a cluster. Thus, the control policy for each of these devices will depend upon not only the model for each device but also upon the model of the other device. Policy 724 shows that the control policy for device 604 depends upon: v (a locally-measured quantity such as voltage or frequency of the grid, or any other quantity external to the device; x (an internally-measured quantity indicating the state of the device such as energy of a battery, power output of a PV system, etc.); $\theta$ (the configuration of the algorithm/function used to implement the control policy such as rules, a neural network, or any suitable mathematical construction); as well as both models 614 and 616. Policy 726 shows a similar control policy for device 606 that also depends upon both models 614 and 616.

The letters $u_1 \ldots u_4$ represent the resulting control action that will actually control a device, such as a particular power (e.g., 0, 1 or 2 MW) that the device shall consume (or provide). This control action will typically change over time, for example in frequency control it may change every second or less, and in the case of the tertiary reserve (in which large industrial devices are switched on or off) it may change on the order of hours.

FIG. 13 is a flow diagram describing one embodiment by which each of two devices in a cluster implements their own local control policy in order to work together in combination. This flow may be used to implement steps 324-328 of FIG. 4 or steps 524-528 of FIG. 6 and is suitable for any of the business contexts described herein, and may be used by a cluster with any number of devices.

In step 482 the parameter values which were stored in step 414 from the optimization of both devices A and B working together are retrieved from memory or data storage of the computer. If the optimization was performed upon both devices then each device has access to its own parameter values and may extract those parameter values needed for its own local control policy. If the optimization was only performed on device A, for example, then these parameter values are also sent to device B. If the optimization was performed at a third-party computer, then this computer sends the parameter values to each of the devices.

Next, in step 484 the local computing hardware of each device plugs in the parameter values (corresponding to its own control policy) into the algorithm representing its own local control policy (i.e., $\pi(A)$ and $\pi(B)$). At this point, each local control policy (examples shown at 724 and 726 in FIG. 12) is ready to calculate its control action, u, needing only to measure any external event v (such as frequency or voltage of the grid), an internal state x (e.g., battery charge, device temperature, PV system output, etc.), and the response of the other device.

Accordingly, in step 486 device A obtains its control action u for the current time interval by measuring v, by measuring x and by calculating the current response of the other device B using the model for device B. This response of the other device (if needed) is then also input into the control policy for device A.

Once the control action u has been calculated for device A it is sent to device A in step 488. Next, in step 490 device A consumes or produces power as dictated by the control action u. The flow diagram then performs an iteration for each relevant time interval by returning to step 486 where the control action is calculated again. Steps 492-496 are performed in parallel for device B.

Thus, both devices work together in the cluster using each other's model in order to respond to a particular business context and control each of their corresponding energy devices in a manner that produces greater benefit than if each had operated alone. One of skill will be able to apply this flow to clusters of more than two devices or to standalone devices.

Example of Two Batteries Performing Frequency Control

Figure 14:
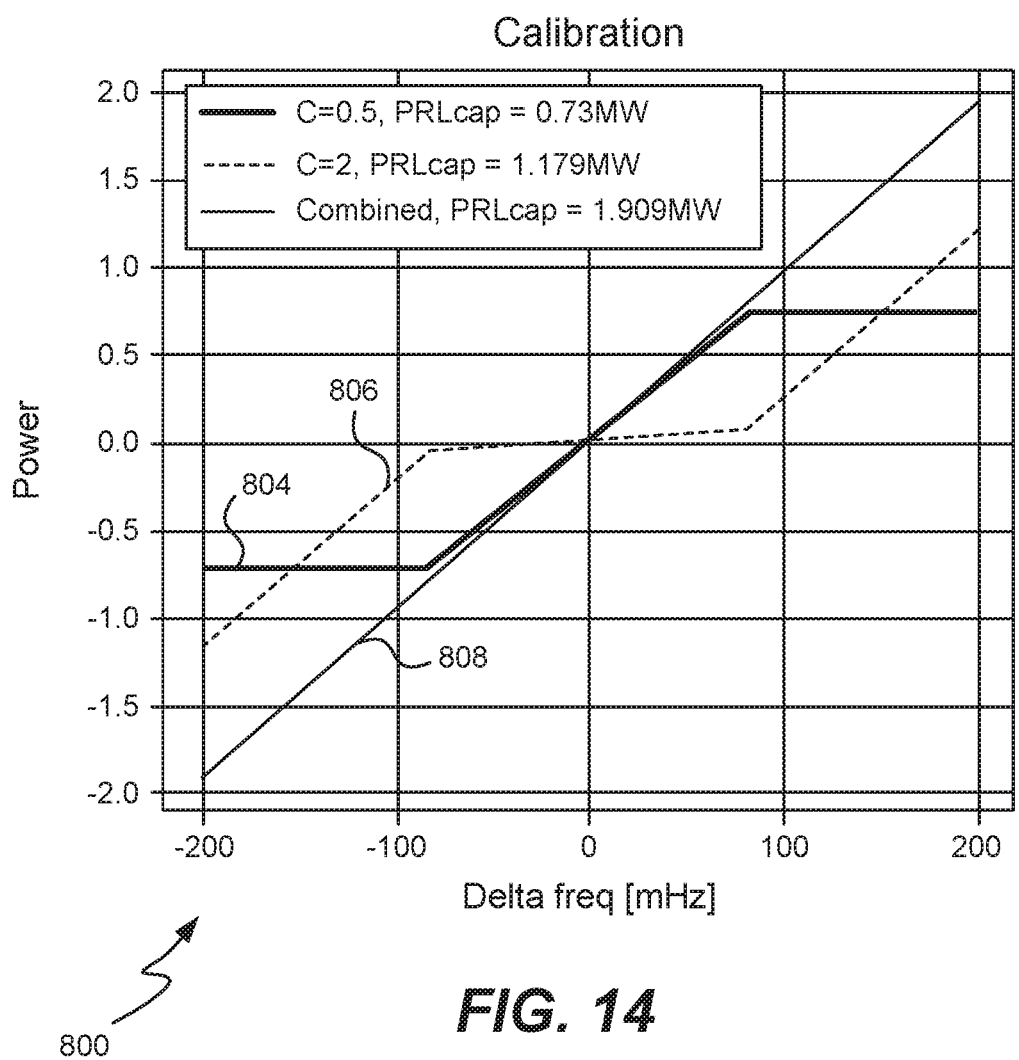
FIG. 14 is a graph showing how two batteries together in a pool can determine how to work together to provide an optimal response in the frequency control context.

FIG. 14 is a graph 800 showing how two batteries in a pool can determine how to work together to provide an optimal response in the frequency control context. In this example, one is a Li-ion battery with a c-rate of 2 and a constraint in number of cycles, the other being a flow battery with a c-rate of 0.5 without any practical constraints on how the battery is used. As a Li-ion battery is constrained by the maximum number of cycles, it is desirable for this battery to work with a flow battery that has no cycle constraints in order to perform frequency control and reduce cycles of the Li-ion battery. The batteries will form a cluster to form one common droop curve in line with their constraints. In this example, although the batteries may not need to exchange models for bidding, they exchange models during cluster creation so that the control policy of each can depend upon the other's model.

Shown is line 804 representing the local control policy of the flow battery that depends upon the model of the Li-ion battery; line 806 is the local control policy of the Li-ion battery that depends upon the model of the flow battery. The droop curve resulting from using both batteries together is shown at line 808 which is a linear response. For example, when the grid frequency is 100 mHz too high, each battery acting alone cannot consume the needed 1 MW of power, but by acting together they can consume that amount. Each battery has determined its local control policy (804 or 806) during cluster creation that is adapted to use the model of the other battery.

Figure 15:
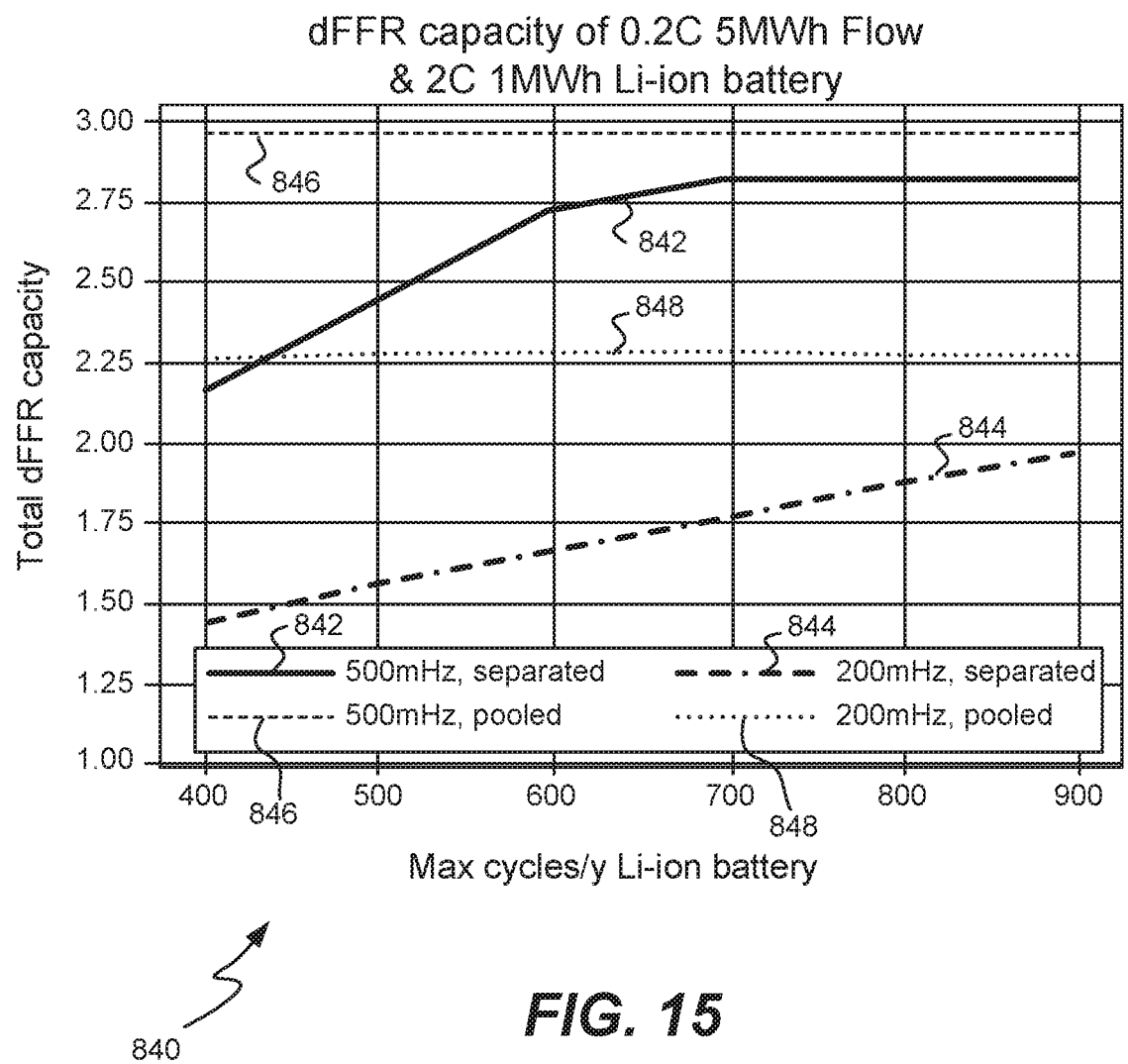
FIG. 15 is a graph showing the results of the battery combination of FIG. 14 as a function of the number of cycles allowed typically by the Li-ion battery.

FIG. 15 is a graph 840 showing the results of the battery combination of FIG. 14 as a function of the number of cycles allowed typically by the Li-ion battery. The graph presents the power that the batteries can offer to the TSO for Fast Frequency Response (FFR), a frequency control service in the United Kingdom, for example, standalone and together using an embodiment of this invention. Line 842 shows the power offered by the Li-ion battery standalone in the 500 mHz band; line 844 shows the power offered standalone in the 200 mHz band, while lines 846 and 848 show, respectively, the power offered by both batteries together in the 500 mHz and 200 mHz band.

As shown, a standalone 500 cycle constrained Li-ion battery offers 2.5 MW in the 500 mHz product and 1.6 MW in the 200 mHz product, but by working together both batteries offer together 2.9 MW and 2.25 MW respectively. Thus, both batteries provide a better response to frequency deviations helping to improve the grid, and the low C battery actually absorbs cycles from the high C battery, thus providing extra value due to degradation mitigation of the high C battery. The extra revenue generated by both batteries working together can be divided, for example, based upon the number of cycles done by the Li-ion battery that would have been done by the flow battery. To calculate these values the droop curves of each battery are used.

The calculations behind the droop curves presented are based upon actual frequency data. Models need not be exchanged during actual operation, although, models may be exchanged in order to determine the control policy of each during, for example, long and/or significant frequency deviations, thus, the batteries would support each other similar to the fast-slow combination discussed below. An example is a frequency deviation of +50 mHz for weeks in a row, the energy state of the 0.5 C battery would keep on increasing, at some point the 2 C battery will come and support, and the model exchange would be similar to the fast-slow combination. The models may also be used to calculate the exchange of cycles from one to the other using a distributed ledger.

Example of Fast-Slow Combinations

In another example, a slow device (e.g., an industrial oven which can be modeled as a first order system) with a time constant of about 30 seconds decides to form a cluster with a 2 C battery. The oven on its own is too slow to participate in frequency control, as such it needs to find a partner device to do so. In order to find this partner it sends its mathematical model to its peer-to-peer partners, via broadcasting to all devices or using, e.g., a proximity heuristic (physical, virtual, etc.) that determines a matching priority, or ranking. An example is to send its model to all batteries or to only send to batteries in order, ranked according to C-rate, i.e., the higher the C-rate the closer the battery will be to the oven in terms of virtual proximity. Once the model has been sent to a particular battery an optimization takes place that optimizes the uplift from combining the two devices. After testing different batteries, a choice is made and the pair may bid together for frequency control. This optimization is described in the flowchart FIG. 8.

The operational control of both devices is done as described below. Once a cluster has been formed, both devices may continue to exchange their models on a regular basis, each model then being used to assist in the control of the other device. The result is that for a 2 C (2 MW, 1 MWh) battery that stand alone can bid in, e.g., 1450 kW in FCR, together with the oven they can bid in 2 MW by having the oven react to the SoC of the battery using a simple P controller. In order to do this the oven needs to have an accurate model of the battery. The battery, likewise, needs to have a model of the oven, the envelope of which can be modeled rather well as first order system (except for noise levels). Updating the models frequently results in a better performance.

One embodiment of the real-time control for these devices is as follows. The oven sends its model to the battery at regular time intervals, an example of such a model is:

$$M_B: P_{B,t} = P_{B,t-1} + (u_t - P_{B,t-1})/\tau$$

where the value of $\tau$ can change over time.
The model of the battery is:

$$M_A: E_{A,t} = E_{A,t-1} + u_t \Delta t$$

where the energy can change over time.

As such the power sent to the oven is:

$$u_{3,t} = \theta_{3,x} v + \theta_{3,y}(E_{A,t} - \theta_{3,z}),$$

which is calculated locally at the level of the oven and requires $E_A$ which can be updated using model $M_A$ at the level of the oven; note that $\theta$ is the vector configuring the local policy.

At the level of the battery using the model $M_B$ of the oven, u3,t is also calculated resulting in:

$$u_{2,t} = \theta_{2,x} v - u_{3,t},$$

where $u_3$ is calculated at the level of the battery using $M_B$.

The result of this fast-slow combination is depicted in more detail in FIGS. 16A-16D where one can see that the energy throughput of the battery becomes significantly less when in combination with the oven.

FIGS. 16A and 16B show the battery operating standalone and in which FIGS. 16C and 16D show the battery operating in combination with a slow industrial device (for example). Graph 850 shows the power of the battery over time and line 852 shows that the power of the battery over time follows the frequency changes on the grid. Graph 860 shows the cumulative energy throughput of the battery over time and line 862 shows that in this example approximately 8 MWh of energy has been extracted from the battery. Because greater energy throughput or cycling of a battery degrades the battery substantially, it is desirable to reduce the energy throughput.

Accordingly, graph 870 shows the power 872 of the battery over time when it is combined in a cluster with a relatively slow industrial device which power is shown at line 874. Advantageously, graph 880 now shows the cumulative energy throughput of the battery over time at line 882. The cumulative energy throughput of the battery in the cluster is now approximately 1.25 MWh, which is approximately six times less than the energy throughput when the battery operates standalone. Thus, formation of a cluster and an exchange of models allow the battery to have less energy throughput resulting in less degradation of the battery.

Example of Self-Reliance Context

Figure 17:
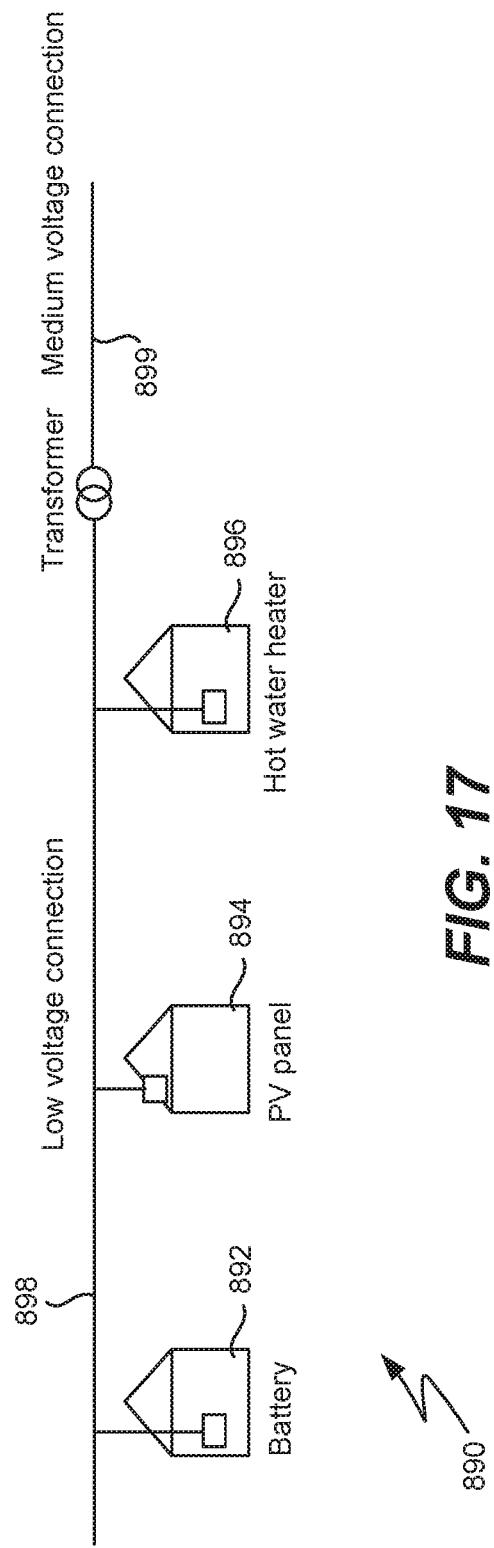
FIG. 17 is an example in which a battery, a PV system and a load (hot water heater) each are part of a dwelling and decide to form a cluster.

FIG. 17 is an example 890 in which a battery 892, a PV system 894 and a load (hot water heater) 896 each are part of a dwelling and decide to form a cluster. In this example, each of the three dwellings is connected to the same electric low-voltage feeder 898 which in turn connects via a transformer to a medium voltage 899. The business context in this example is self-reliance, i.e., the objective is to minimize the export and import of energy flowing through the transformer in order to minimize energy loss. This objective can be expressed in a formula:

$$\min |P_1 + P_2 + P_3|$$

with $P_1$, $P_2$ and $P_3$ being the power of the battery, PV system and hot water heater respectively. These devices may form a cluster without exchanging models (based upon a proximity heuristic) or, may exchange models before forming the cluster.

The model sent by the PV system to devices 892 and 896 is basically its production forecast $P_2^F$. The control policies of the battery and heater will then depend upon the other's models. A simple control policy for the battery is that the battery charges in an amount equal to the power of the PV system minus the needed power predicted by the hot water heater model, i.e., the battery charges if enough energy remains after providing power to the heater:

$$P_1 = -P_2 - P_3$$

The policy of the hot water heater is that the heater goes on (unless the hot water tank is empty, an internal state) when the battery is full and there is still excess PV system power, according to:

$$P_3 = -P_2 \text{ if } E_1 > \theta_3$$

where $E_1$ of the battery must be greater than a quantity for the heater to go on, the quantity depending upon a control policy of the heater.

Distributed Ledger Embodiment

Various steps of the invention may benefit from being implemented using a distributed ledger (such as a block chain). For example, a distributed ledger may be used to exchange models, i.e., models are sent using a distributed ledger that validates the model through a peer-to-peer communication network (such as a network that is N-1 secure). If device A and device B decide to work together in a virtual pool and exchange models $M_A$ and $M_B$, as a consequence the behavior of device A will be influenced by device B and vice versa, thus, a distributed ledger provides security for the transaction. Models can be updated on a regular basis, again using a distributed ledger.

The models may be used to calculate the exchange of physical constraints between loads (such as the number of run cycles) again using a distributed ledger that secures the transaction. The values of the transactions may be used in contracts between the loads of the cluster. In the case of two batteries, models are exchanged through a distributed ledger where the other devices in the pool support in mining the block chains in order to make sure that the number of cycles exchanged is calculated in the correct way and is not prone to manipulation. Or, the distributed ledger is used to calculate the exchange of the number of cycles from a battery to a slow device.

In addition, the optimization of FIG. 8 may also be done using a distributed ledger. As such, starting from models $M_A$ and $M_B$, a distributed ledger may be used to calculate the stand alone power and the cycles that would have been obtained stand alone and in tandem, the difference is the cycles and power that have been exchanged and can be used for mutual remuneration. And, the consensus building of FIG. 10 may also be done using a distributed ledger.

Computer System Embodiment

FIGS. 18A and 18B illustrate a computer system 900 suitable for implementing embodiments of the present invention. FIG. 18A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 18B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of controlling an energy device, said method comprising:
receiving at each energy device in a pool of energy devices a service context from a central entity that commands each energy device to provide said service to a grid operator;
applying a heuristic at a first device agent executing on a first computer representing a first energy device in order to identify a second energy device in said pool;
receiving at said first computer a power model of said second energy device identified by said heuristic, wherein a power model of said first energy device exists on said first computer;
performing an optimization on said first computer to calculate a value of said first and second energy devices working together to provide said service;
forming a cluster of said first and second energy devices; and
outputting a first control action from said first device agent to provide a first power level to said first energy device that partially depends upon said power model of said second energy device and that provides said service to said grid operator.

2. A method as recited in claim 1 wherein said first and second energy devices are thermal energy devices.

3. A method as recited in claim 1 wherein said first and second energy devices are electrical energy devices.

4. A method as recited in claim 1 wherein said performing an optimization includes performing optimizations in order to rank said energy devices of said pool in terms of the value to provide said service when an energy device is combined with said first energy device, and selecting said second energy device from said ranked energy devices.

5. A method as recited in claim 4 further comprising:
storing parameters from an optimization of said first and second energy devices, and using said parameters in said outputting of said first control action.

6. A method as recited in claim 1 further comprising:
outputting a second control action from said second device agent to provide a power level to said second energy device that partially depends upon said power model of said first energy device.

7. A method as recited in claim 1 wherein said first and second energy devices are peers in said pool of energy devices.

8. A method as recited in claim 1 wherein said first computer is local to said first energy device.

9. A method as recited in claim 1 further comprising:
storing parameters from said optimization of said first and second energy devices, and using said parameters in said outputting of said first control action.

10. A method as recited in claim 1 further comprising:
executing a second device agent on a second computer representing said second energy device;
receiving at said second computer a power model of said first energy device;
outputting a second control action from said second device agent to provide a second power level to said second energy device that partially depends upon said power model of said first energy device and that provides said service to said grid operator.

11. A method as recited in claim 10 further comprising:
performing an optimization on said second computer to calculate a value of said first and second energy devices working together to provide said service; and
storing parameters from said optimization of said first and second energy devices, and using said parameters in said outputting of said second control action.

12. A system for controlling an energy device, said system comprising:
a central entity computer;
a pool of energy devices, each of said devices receiving a service context from said central entity computer that commands each energy device to provide said service to a grid operator, said pool including a first energy device and a second energy device;
a first device agent executing on a first computer representing said first energy device arranged to apply a heuristic in order to identify said second energy device in said pool, wherein a power model of said first energy device exists on said first computer, said device agent being further arranged to receive a power model of said second energy device identified by said heuristic, to perform an optimization on said first computer to calculate a value of said first and second energy devices working together to provide said service, and to output a first control action from said first device agent to provide a first power level to said first energy device that partially depends upon said power model of said second energy device and that provides said service to said grid operator.

13. A method of controlling an energy device in a self-reliance mode, said method comprising:
applying a heuristic at a first device agent executing on a first computer representing a first energy device in order to identify a second energy device in a pool of energy devices that provides energy complementary to said first energy device;
forming a cluster of said first and second energy devices in which a net energy to or from said cluster is minimized;
receiving at said first computer a power model of said second energy device, wherein a power model of said first energy device exists on said first computer; and
outputting a first control action from said first device agent to provide a power level to said first energy device that partially depends upon said power model of said second energy device.

14. A method as recited in claim 13 wherein said first and second energy devices are thermal energy devices.

15. A method as recited in claim 13 wherein said first and second energy devices are electrical energy devices.

16. A method as recited in claim 13 wherein said forming a cluster includes performing optimizations in order to rank said energy devices of said pool in terms of the value to provide said minimized net energy when an energy device is combined with said first energy device, and selecting said second energy device from said ranked energy devices.

17. A method as recited in claim 16 further comprising:
storing parameters from an optimization of said first and second energy devices, and using said parameters in said outputting of said first control action.

18. A method as recited in claim 13 wherein each of said first and second energy devices are each in a default self-reliance mode or are in a self-reliance mode because communication with a central entity has been lost, and wherein said steps of claim 13 are performed without input from a central entity.

19. A method as recited in claim 13 wherein each of said first and second energy devices receives a self-reliance context command from a central entity and wherein no input is received from said central entity during said steps of claim 13.

20. A method as recited in claim 13 further comprising:
executing a second device agent on a second computer representing said second energy device;
receiving at said second computer a power model of said first energy device;
outputting a second control action from said second device agent to provide a power level to said second energy device that partially depends upon said power model of said first energy device.

21. A method as recited in claim 13 wherein said first and second energy devices are peers in said pool of energy devices.

22. A method as recited in claim 13 wherein said first computer is local to said first energy device.

23. A method as recited in claim 13 wherein said heuristic is a proximity heuristic and wherein said second energy device is the closest energy device of said pool to said first energy device that provides said complementary energy.

24. A method as recited in claim 20 further comprising:
performing an optimization on said second computer to calculate a value of said first and second energy devices working together to provide said service; and
storing parameters from said optimization of said first and second energy devices, and using said parameters in said outputting of said second control action.

25. A system for controlling an energy device in a self-reliance mode, said system comprising:
a pool of energy devices, each of said devices having a service context that commands each energy device to operate in a self-reliance mode, said pool including a first energy device and a second energy device;
a first device agent executing on a first computer representing said first energy device arranged to apply a heuristic in order to identify said second energy device in said pool that provides energy complementary to said first energy device, to form a cluster of said first and second energy devices in which a net energy to or from said cluster is minimized, wherein a power model of said first energy device exists on said first computer, said device agent being further arranged to receive a power model of said second energy device identified by said heuristic, and to output a first control action from said first device agent to provide a first power level to said first energy device that partially depends upon said power model of said second energy device and that minimizes said net energy.

26. A method of providing a service to a grid operator, said method comprising:
forming a plurality of clusters of energy devices out of a pool of energy devices, each cluster being formed by exchanging models between energy devices of said each cluster and optimizing said each cluster using said models to provide said service;
sending a request from a service manager to said each cluster for a bid that partially provides said service, said each bid being based upon a current multiplier;
comparing a total of all bids from said clusters to a bid from said service manger to provide said service;
determining that said total of all bids from said clusters is close enough to said service manager bid; and
each energy device of each of said clusters implementing a control policy based upon said optimizing of said each cluster, wherein said service is provided.

27. A method as recited in claim 26 wherein said energy devices are thermal energy devices.

28. A method as recited in claim 26 wherein said energy devices are electrical energy devices.

29. A method as recited in claim 26 further comprising:
storing parameters from said optimizing of said each cluster, and using said stored parameters in said implementing a control policy of said each energy devices.

30. A method as recited in claim 26 wherein each of said implemented control policies of said each cluster partially depends upon a power model of at least one other energy device in said each cluster.

31. A method as recited in claim 26 wherein said multiplier represents a value desirable by said each cluster.

32. A method as recited in claim 26 further comprising:
forming said clusters without input by said service manager.

33. A method as recited in claim 26 wherein said clusters include at least one standalone energy device.

34. A system for providing a service to a grid operator, said system comprising:
a plurality of clusters of energy devices, each cluster being formed by exchanging models between energy devices of said each cluster and optimizing said each cluster using said models to provide said service, wherein each energy device of each of said clusters being arranged to implement a control policy based upon said optimizing of said each cluster, wherein said service is provided; and
a service manager computer arranged to send to each of said clusters a request for a bid to partially provide said service and a current multiplier, to receive said each bid based upon said current multiplier from said each cluster, to compare a total of all of said bids from said clusters to a bid from said service manger to provide said service, to determine that said total of all bids from said clusters is close to said service manager bid, and to direct said energy devices to implement said each control policy based upon said each bid from said clusters.

35. A method of providing a service to a grid operator using a distributed architecture, said method comprising:
forming a plurality of clusters of energy devices out of a pool of energy devices, each cluster being formed by exchanging models between energy devices of said each cluster and optimizing said each cluster using said models to provide said service;
executing a plurality of service manager processes, each service manager process representing one of said clusters and executing on a computer local to one of said clusters;
implementing a peer-to-peer consensus-seeking technique in order to iteratively request bids from said clusters using said service manager processes, wherein each of said bids partially providing said service, and wherein said each bid being based upon a current multiplier;
comparing a total of all bids from said clusters to a bid from one of said service manager processes that represents a service manger to provide said service;
determining that said total of all bids from said clusters is close enough to said service manager bid; and
each energy device of each of said clusters implementing a control policy based upon said optimizing of said each cluster, wherein said service is provided.

36. A method as recited in claim 35 wherein said energy devices are thermal energy devices.

37. A method as recited in claim 35 wherein said energy devices are electrical energy devices.

38. A method as recited in claim 35 further comprising:
storing parameters from said optimizing of said each cluster, and using said stored parameters in said implementing a control policy of said each energy devices.

39. A method as recited in claim 35 wherein each of said implemented control policies of said each cluster partially depends upon a power model of at least one other energy device in said each cluster.

40. A method as recited in claim 35 wherein said multiplier represents a value desirable by said each cluster.

41. A method as recited in claim 35 further comprising:
performing said steps of claim 35 without input by said service manager.

42. A method as recited in claim 35 wherein said clusters include at least one standalone energy device.

43. A system of providing a service to a grid operator using a distributed architecture, said system comprising:
a plurality of clusters of energy devices, each cluster being formed by exchanging models between energy devices of said each cluster and optimizing said each cluster using said models to provide said service, wherein each energy device of each of said clusters being arranged to implement a control policy based upon said optimizing of said each cluster, wherein said service is provided; and
a plurality of computers, each computer representing one of said clusters and executing a service manager process, wherein each service manager process being arranged to implement a peer-to-peer consensus-seeking technique in order to iteratively request and receive bids from other of said service manager processes to partially provide said service based upon a current multiplier, to compare a total of all of said bids from said clusters to a bid from one of said service manager processes that represents a service manger to provide said service, to determine that said total of all bids from said clusters is close to said service manager bid, and to direct said energy devices to implement said each control policy based upon said each bid from said clusters.

44. A method of controlling an energy device, said method comprising:
receiving at each energy device in a pool of energy devices a technical constraint of one of said devices or of a power grid from a central entity that commands each energy device to satisfy said technical constraint;
applying a heuristic at a first device agent executing on a first computer representing a first energy device in order to identify a second energy device in said pool;
receiving at said first computer a power model of said second energy device identified by said heuristic, wherein a power model of said first energy device exists on said first computer;
performing an optimization on said first computer to calculate the ability of said first and second energy devices working together to satisfy said technical constraint;
forming a cluster of said first and second energy devices; and
outputting a first control action from said first device agent to provide a first power level to said first energy device that partially depends upon said power model of said second energy device and that satisfies said technical constraint.

45. A system for controlling an energy device, said system comprising:
a central entity computer;
a pool of energy devices, each of said devices receiving a technical constraint from said central entity computer that commands each energy device to satisfy said technical constraint, said pool including a first energy device and a second energy device;
a first device agent executing on a first computer representing said first energy device arranged to apply a heuristic in order to identify said second energy device in said pool, wherein a power model of said first energy device exists on said first computer, said device agent being further arranged to receive a power model of said second energy device identified by said heuristic, to perform an optimization on said first computer to calculate the ability of said first and second energy devices working together to satisfy said technical constraint, and to output a first control action from said first device agent to provide a first power level to said first energy device that partially depends upon said power model of said second energy device and that satisfies said technical constraint.

* * * * *